US011489847B1

(12) United States Patent
Uplinger, II et al.

(10) Patent No.: US 11,489,847 B1
(45) Date of Patent: Nov. 1, 2022

(54) SYSTEM AND METHOD FOR PHYSICALLY DETECTING, IDENTIFYING, AND DIAGNOSING MEDICAL ELECTRONIC DEVICES CONNECTABLE TO A NETWORK

(71) Applicant: NOKOMIS, INC., Canonsburg, PA (US)

(72) Inventors: James Robert Uplinger, II, Cranberry Township, PA (US); Walter J. Keller, III, Bridgeville, PA (US); Adam Brant, Bethel Park, PA (US)

(73) Assignee: NOKOMIS, INC.

( * ) Notice: Subject to any disclaimer, the term of this patent is extended or adjusted under 35 U.S.C. 154(b) by 82 days.

(21) Appl. No.: 15/898,020

(22) Filed: Feb. 15, 2018

Related U.S. Application Data

(60) Provisional application No. 62/630,786, filed on Feb. 14, 2018.

(51) Int. Cl.
*H04L 29/06* (2006.01)
*H04L 9/40* (2022.01)
*H04L 67/12* (2022.01)

(52) U.S. Cl.
CPC ...... *H04L 63/1416* (2013.01); *H04L 63/1441* (2013.01); *H04L 67/12* (2013.01)

(58) Field of Classification Search
CPC ............. H04L 63/1425; H04L 63/1416; H04L 63/145; H04L 63/1408; H04L 63/1441;
(Continued)

(56) References Cited

U.S. PATENT DOCUMENTS 3,028,596 A 4/1962 McGillem et al.
3,599,211 A 8/1971 Mardon
(Continued)

FOREIGN PATENT DOCUMENTS

DE 102005040494 3/2007
JP 63085373 4/1988
(Continued)

OTHER PUBLICATIONS

HyperPhysics, 'Cesium Atomic Clock', Dec. 4, 2017, http://hyperphysics.phy-astr.gsu.edu/hbase/acloc.html, as retreived from web.archive.org at http://web.archive.org/web/20171204210104/http://hyperphysics.phy-astr.gsu.edu/hbase/acloc.html.*
(Continued)

*Primary Examiner* — Richard A McCoy
(74) *Attorney, Agent, or Firm* — AP Patents; Alexander Pokot

(57) ABSTRACT

A method for detecting, in a real-time manner, a presence or an absence of a an anomaly in or a cyber attack onto a medical apparatus comprises the steps of capturing, with an antenna, one or more emissions of electromagnetic energy from the processing devices within medical apparatus; converting, with a receiver coupled to the antenna, the one or more emissions from an analog to a digital form; generating, with a controller, a digital signal in a time domain; converting, the digital signal from the time domain to a frequency domain, the digital signal containing a signature of cross modulation products from the non-linear attachments; processing, in the frequency domain, the signature of cross modulation products to determine mixing characteristics of the cross modulation products; and detecting, based on the mixing characteristics, the absence or the presence of the anomaly or the cyber attack.

24 Claims, 11 Drawing Sheets

(58) Field of Classification Search
CPC ......... H04L 67/12; G06F 21/00; G06F 21/50; G06F 21/556; G06F 21/567; G06F 21/566; G06F 21/544; G01R 13/20; G01R 13/22; G01R 13/28; G01R 13/32; G01R 13/325
See application file for complete search history.

(56) References Cited

U.S. PATENT DOCUMENTS

| | | |
|---|---|---|
| 3,631,484 A | 12/1971 | Angenblick |
| 3,707,672 A | 12/1972 | Miller et al. |
| 3,732,567 A | 5/1973 | Low et al. |
| 3,795,911 A | 3/1974 | Hammack |
| 3,911,435 A | 10/1975 | Mardon et al. |
| 3,930,734 A | 1/1976 | Holly et al. |
| 4,035,797 A | 7/1977 | Nagy |
| 4,053,891 A | 10/1977 | Opitz |
| 4,058,804 A | 11/1977 | Sawada et al. |
| 4,121,214 A | 10/1978 | Marinaccio et al. |
| 4,239,388 A | 12/1980 | Green |
| 4,303,910 A | 12/1981 | McCann |
| 4,351,029 A | 9/1982 | Maxey et al. |
| 4,380,172 A | 4/1983 | Imam et al. |
| 4,442,494 A | 4/1984 | Fromson et al. |
| 4,496,900 A | 1/1985 | Di Stefano et al. |
| 4,614,945 A | 9/1986 | Brunius et al. |
| 4,648,124 A | 3/1987 | Mantovani et al. |
| 4,650,333 A | 3/1987 | Crabb et al. |
| 4,658,245 A | 4/1987 | Dye et al. |
| 4,726,224 A | 2/1988 | D'Ausilio |
| 4,827,414 A | 5/1989 | Christianson et al. |
| 5,006,788 A | 4/1991 | Goulette et al. |
| 5,020,411 A | 6/1991 | Rowan |
| 5,028,866 A | 7/1991 | Wiese |
| 5,073,782 A | 12/1991 | Huguenin et al. |
| 5,126,677 A | 6/1992 | Campbell et al. |
| 5,191,343 A | 3/1993 | Danzer et al. |
| 5,218,294 A | 6/1993 | Soiferman |
| 5,227,800 A | 7/1993 | Huguenin et al. |
| 5,251,144 A | 10/1993 | Ramamurthi |
| 5,265,112 A * | 11/1993 | Noll ................. H01S 3/0057 372/32 |
| 5,270,222 A | 12/1993 | Moslehi |
| 5,278,572 A * | 1/1994 | Harada ............. H01Q 1/1285 343/713 |
| 5,293,216 A | 3/1994 | Moslehi |
| 5,300,879 A | 4/1994 | Masuda et al. |
| 5,302,830 A | 4/1994 | Shivanandan |
| 5,339,080 A | 8/1994 | Steinway et al. |
| 5,355,227 A * | 10/1994 | Ko ..................... H04N 5/93 386/307 |
| 5,406,209 A | 4/1995 | Johnson et al. |
| 5,417,494 A | 5/1995 | Kempa et al. |
| 5,424,633 A | 6/1995 | Soiferman |
| 5,428,556 A | 6/1995 | Torizawa et al. |
| 5,517,110 A | 5/1996 | Soiferman |
| 5,537,909 A | 7/1996 | Schneider et al. |
| 5,539,325 A | 7/1996 | Rostoker et al. |
| 5,552,705 A | 9/1996 | Keller |
| 5,563,702 A | 10/1996 | Emery et al. |
| 5,578,930 A | 11/1996 | Sheen |
| 5,592,170 A | 1/1997 | Price et al. |
| 5,610,705 A | 3/1997 | Brosnan et al. |
| 5,631,572 A | 5/1997 | Sheen et al. |
| 5,668,342 A | 9/1997 | Discher |
| 5,714,888 A | 2/1998 | Naujoks |
| 5,719,495 A | 2/1998 | Moslehi |
| 5,754,450 A | 5/1998 | Solomon et al. |
| 5,764,087 A | 6/1998 | Clark |
| 5,798,577 A | 8/1998 | Lesesky et al. |
| 5,854,994 A | 12/1998 | Canada et al. |
| 5,900,618 A | 5/1999 | Anlage et al. |
| 5,900,833 A | 5/1999 | Sunlin et al. |
| 5,905,572 A | 5/1999 | Li |
| 5,905,577 A | 5/1999 | Wilsher et al. |
| 5,907,491 A | 5/1999 | Canada et al. |
| 5,859,596 A | 6/1999 | McRae |
| 5,859,613 A | 6/1999 | Otto |
| 5,942,991 A | 8/1999 | Gaudreau et al. |
| 6,027,216 A * | 2/2000 | Guyton ................. A61B 3/113 351/200 |
| 6,049,220 A | 4/2000 | Borden et al. |
| 6,049,301 A | 4/2000 | Weagant |
| 6,057,765 A | 5/2000 | Jones et al. |
| 6,118,279 A | 9/2000 | Field et al. |
| 6,124,725 A | 9/2000 | Sato |
| 6,137,439 A | 10/2000 | Bradford et al. |
| 6,144,341 A | 11/2000 | Kraz |
| 6,150,793 A | 11/2000 | Lesesky et al. |
| 6,150,809 A | 11/2000 | Tiernan et al. |
| 6,163,259 A | 12/2000 | Barsumian et al. |
| 6,236,223 B1 | 5/2001 | Brady et al. |
| 6,243,036 B1 | 6/2001 | Chadwick et al. |
| 6,268,738 B1 | 7/2001 | Gunlhorpe et al. |
| 6,281,697 B1 | 8/2001 | Masuda et al. |
| 6,324,486 B1 | 11/2001 | Crook et al. |
| 6,331,782 B1 | 12/2001 | White et al. |
| 6,359,444 B1 | 3/2002 | Grimes |
| 6,359,582 B1 | 3/2002 | MacAleese et al. |
| 6,363,332 B1 | 3/2002 | Rangarajan et al. |
| 6,375,347 B1 | 4/2002 | Bruce et al. |
| 6,417,797 B1 | 7/2002 | Cousins et al. |
| 6,455,766 B1 | 9/2002 | Cook et al. |
| 6,456,070 B1 | 9/2002 | Kazama et al. |
| 6,466,882 B1 | 10/2002 | Kang et al. |
| 6,480,141 B1 | 11/2002 | Toth et al. |
| 6,489,884 B1 | 12/2002 | Lamberson et al. |
| 6,489,919 B1 | 12/2002 | Brock |
| 6,496,703 B1 | 12/2002 | da Silva |
| 6,612,172 B2 | 9/2003 | Cadet et al. |
| 6,667,711 B1 | 12/2003 | Joshi et al. |
| 6,700,526 B2 | 3/2004 | Witten |
| 6,720,905 B2 | 4/2004 | Levitan et al. |
| 6,759,850 B2 | 7/2004 | Harzanu et al. |
| 6,759,863 B2 | 7/2004 | Moore |
| 6,759,864 B2 | 7/2004 | Patel |
| 6,765,527 B2 | 7/2004 | Jablonski et al. |
| 6,785,553 B2 | 8/2004 | Chang et al. |
| 6,825,456 B2 | 11/2004 | Chadwick et al. |
| 6,859,285 B1 | 2/2005 | Chang |
| 6,864,825 B2 | 3/2005 | Holly |
| 6,870,889 B1 | 3/2005 | Sugiura |
| 6,879,167 B2 | 4/2005 | Ju et al. |
| 6,894,630 B1 * | 5/2005 | Massie ................. H03M 1/0626 341/118 |
| 6,897,777 B2 | 5/2005 | Holmes et al. |
| 6,911,925 B1 * | 6/2005 | Slavin ................. H03M 1/0626 341/117 |
| 6,927,579 B2 | 8/2005 | Blades |
| 6,940,295 B2 | 9/2005 | Engelbart et al. |
| 6,947,800 B2 | 9/2005 | Flanagan et al. |
| 6,970,762 B1 | 11/2005 | Elliott et al. |
| 6,985,771 B2 | 1/2006 | Fischell et al. |
| 7,002,470 B1 | 2/2006 | Miao |
| 7,010,386 B2 | 3/2006 | McDonnell et al. |
| 7,034,660 B2 | 4/2006 | Watters et al. |
| 7,039,491 B1 | 5/2006 | Delbrugge, Jr. et al. |
| 7,046,187 B2 | 5/2006 | Fullerton et al. |
| 7,086,593 B2 | 8/2006 | Woodard et al. |
| 7,103,460 B1 | 9/2006 | Breed |
| 7,130,624 B1 | 10/2006 | Jackson et al. |
| 7,138,963 B2 | 11/2006 | Duff et al. |
| 7,142,147 B2 | 11/2006 | Holly |
| 7,145,356 B2 | 12/2006 | Sang Gi |
| 7,145,453 B2 | 12/2006 | Miller, Jr. et al. |
| 7,162,285 B2 | 1/2007 | Owens et al. |
| 7,188,037 B2 | 3/2007 | Hidehira |
| 7,218,093 B2 | 5/2007 | Cirkel et al. |
| 7,220,990 B2 | 5/2007 | Aghababazadeh et al. |
| 7,233,285 B2 | 6/2007 | Struckman |
| 7,250,781 B2 | 7/2007 | Nakagawa et al. |
| 7,250,785 B2 | 7/2007 | Kawaike et al. |
| 7,256,055 B2 | 8/2007 | Aghababazadeh et al. |

(56) References Cited

U.S. PATENT DOCUMENTS

| | | |
|---|---|---|
| 7,268,728 B1 | 9/2007 | Struckman |
| 7,289,873 B2 | 10/2007 | Redecker et al. |
| 7,328,126 B2 | 2/2008 | Chamness |
| 7,355,417 B1 | 4/2008 | Shusterman et al. |
| 7,391,356 B2 | 6/2008 | Brumley, II et al. |
| 7,397,421 B2 | 7/2008 | Smith |
| 7,424,338 B1 | 9/2008 | Wipert |
| 7,427,947 B1 | 9/2008 | Dark et al. |
| 7,454,202 B2 | 11/2008 | de La Chapelle |
| 7,464,005 B1 | 12/2008 | Beetner et al. |
| 7,466,157 B2 | 12/2008 | Miller |
| 7,492,303 B1 | 2/2009 | Levitan et al. |
| 7,512,511 B1 | 3/2009 | Schultz et al. |
| 7,515,094 B2 | 4/2009 | Keller, III |
| 7,554,352 B2 | 6/2009 | Huie |
| 7,609,199 B2 | 10/2009 | Nishijima et al. |
| 7,639,178 B1 | 12/2009 | Mulbrook et al. |
| 7,645,982 B1 | 1/2010 | King |
| 7,646,005 B2 | 1/2010 | Chase et al. |
| 7,671,784 B2 | 3/2010 | Steinway et al. |
| 7,683,830 B2 | 3/2010 | Montgomery et al. |
| 7,688,264 B2 | 3/2010 | Chun |
| 7,710,131 B1 | 5/2010 | Tiernan |
| 7,710,287 B2 | 5/2010 | Lange et al. |
| 7,777,671 B2 | 8/2010 | Schnitzer et al. |
| 7,777,672 B2 | 8/2010 | Schnitzer et al. |
| 7,778,367 B1 | 8/2010 | Stockmaster |
| 7,782,251 B2 | 8/2010 | Bishop et al. |
| 7,795,596 B2 | 9/2010 | Chowdhury |
| 7,844,341 B2 | 11/2010 | Von Arx et al. |
| 7,853,437 B2 | 12/2010 | Seguin et al. |
| 7,864,107 B1 | 1/2011 | Lehtola |
| 7,902,834 B2 | 3/2011 | Wolfe et al. |
| 7,928,577 B2 | 4/2011 | Sandhu et al. |
| 7,956,617 B1 | 6/2011 | McCarthy et al. |
| 7,999,723 B2 | 8/2011 | Jung et al. |
| 8,028,208 B2 | 9/2011 | Moore |
| 8,063,739 B2 | 11/2011 | Kean |
| 8,063,813 B1 | 11/2011 | Keller |
| 8,069,490 B2 | 11/2011 | Gross et al. |
| 8,103,463 B2 | 1/2012 | Kalgren et al. |
| 8,131,564 B2 | 3/2012 | Dicks et al. |
| 8,193,819 B2 | 6/2012 | Wang et al. |
| 8,294,616 B1 | 10/2012 | Ormesher et al. |
| 8,344,745 B2 | 1/2013 | Aghababazadeh et al. |
| 8,390,307 B2 | 3/2013 | Slupsky et al. |
| 8,537,050 B2 | 9/2013 | Freeman et al. |
| 8,548,649 B2 | 10/2013 | Guyette et al. |
| 8,643,539 B2 | 2/2014 | Pauly et al. |
| 8,661,980 B1 | 3/2014 | Roemerman et al. |
| 8,825,823 B2 | 9/2014 | Keller, III |
| 8,878,725 B2 | 11/2014 | Lu |
| 9,059,189 B2 | 6/2015 | Keller, III et al. |
| 9,083,351 B1* | 7/2015 | Lee .............. H03L 7/0812 |
| 9,205,270 B2 | 12/2015 | Pathak et al. |
| 9,285,463 B1 | 3/2016 | Freeman et al. |
| 9,443,843 B2 | 9/2016 | Lee et al. |
| 10,068,230 B2* | 9/2018 | Mestre ............. G06Q 20/102 |
| 10,235,523 B1* | 3/2019 | Keller, III ......... G06F 13/4282 |
| 2001/0011903 A1 | 8/2001 | O'Neill et al. |
| 2001/0056340 A1 | 12/2001 | Gorin et al. |
| 2002/0011852 A1 | 1/2002 | Mandelis et al. |
| 2002/0024432 A1 | 2/2002 | Lin et al. |
| 2002/0039030 A1 | 4/2002 | Khazei |
| 2002/0075017 A1 | 6/2002 | Edwards et al. |
| 2002/0089671 A1* | 7/2002 | Hill ............... G03F 7/70725 |
| | | 356/486 |
| 2002/0121915 A1 | 9/2002 | Alonso Montull et al. |
| 2002/0140592 A1* | 10/2002 | Nguyen .............. G06F 13/4072 |
| | | 341/144 |
| 2003/0001596 A1 | 1/2003 | Suga et al. |
| 2003/0034444 A1 | 2/2003 | Chadwick et al. |
| 2003/0071262 A1 | 4/2003 | Weiner et al. |
| 2003/0126017 A1* | 7/2003 | Rau ................ G06Q 40/02 |
| | | 705/16 |
| 2003/0137318 A1 | 7/2003 | Enachescu et al. |
| 2003/0155927 A1 | 8/2003 | Pinto et al. |
| 2003/0179126 A1 | 9/2003 | Jablonski et al. |
| 2003/0206027 A1 | 11/2003 | Nozoe et al. |
| 2004/0027149 A1 | 2/2004 | Aitren et al. |
| 2004/0041724 A1 | 3/2004 | Levitan et al. |
| 2004/0078160 A1 | 4/2004 | Frei et al. |
| 2004/0095243 A1 | 5/2004 | Holmes et al. |
| 2004/0100280 A1 | 5/2004 | Ju et al. |
| 2004/0161062 A1* | 8/2004 | Richey ............. H03M 1/0614 |
| | | 375/344 |
| 2004/0218249 A1 | 11/2004 | Kochergin |
| 2005/0046430 A1 | 3/2005 | Kinnunen et al. |
| 2005/0064922 A1 | 3/2005 | Owens et al. |
| 2005/0116307 A1 | 6/2005 | De Jongh et al. |
| 2005/0165456 A1 | 7/2005 | Mann et al. |
| 2005/0207522 A1* | 9/2005 | Lindner ............ H03L 7/0891 |
| | | 375/376 |
| 2005/0265124 A1 | 12/2005 | Smith |
| 2006/0082488 A1 | 4/2006 | Keller, III |
| 2006/0103378 A1 | 5/2006 | Pakdaman et al. |
| 2006/0114157 A1 | 6/2006 | Kolanek et al. |
| 2006/0152232 A1 | 7/2006 | Shvets et al. |
| 2006/0208672 A1 | 9/2006 | Achenbach et al. |
| 2006/0220858 A1 | 10/2006 | Kawamata |
| 2006/0259082 A1 | 11/2006 | Youker et al. |
| 2007/0013577 A1 | 1/2007 | Schnitzer et al. |
| 2007/0027643 A1 | 1/2007 | Lesesky et al. |
| 2007/0040118 A1 | 2/2007 | Cheng et al. |
| 2007/0046298 A1 | 3/2007 | Satai et al. |
| 2007/0063886 A1 | 3/2007 | Brumley, II et al. |
| 2007/0069949 A1 | 3/2007 | Ferreol et al. |
| 2007/0120571 A1 | 5/2007 | Huie |
| 2007/0120738 A1 | 5/2007 | Stroud |
| 2007/0139247 A1 | 6/2007 | Brown et al. |
| 2007/0213951 A1 | 9/2007 | Van Eeden |
| 2007/0214133 A1 | 9/2007 | Liberty et al. |
| 2007/0229270 A1 | 10/2007 | Rofougaran |
| 2007/0234058 A1 | 10/2007 | White |
| 2007/0279071 A1 | 12/2007 | Orton |
| 2007/0282541 A1 | 12/2007 | Griess et al. |
| 2008/0012579 A1 | 1/2008 | Kuhns et al. |
| 2008/0048673 A1 | 2/2008 | Tan et al. |
| 2008/0094222 A1* | 4/2008 | Kaoru ............... G06K 7/0008 |
| | | 340/572.7 |
| 2008/0094273 A1 | 4/2008 | Doyen |
| 2008/0103555 A1 | 5/2008 | Dicks et al. |
| 2008/0141072 A1 | 6/2008 | Kalgren et al. |
| 2008/0168895 A1 | 7/2008 | Duong |
| 2008/0169968 A1 | 7/2008 | Easthope et al. |
| 2008/0177486 A1 | 7/2008 | Farkas |
| 2008/0204275 A1 | 8/2008 | Wavering et al. |
| 2008/0206718 A1 | 8/2008 | Jaklitsch et al. |
| 2008/0254738 A1 | 10/2008 | Brumley et al. |
| 2008/0259084 A1 | 10/2008 | Chang et al. |
| 2008/0284609 A1 | 11/2008 | Rofougaran |
| 2008/0297396 A1 | 12/2008 | Dark et al. |
| 2009/0002000 A1 | 1/2009 | Nikawa |
| 2009/0030487 A1 | 1/2009 | Lang |
| 2009/0078146 A1 | 3/2009 | Tepera et al. |
| 2009/0099830 A1 | 4/2009 | Gross et al. |
| 2009/0154589 A1 | 6/2009 | Monnerie |
| 2009/0196323 A1* | 8/2009 | McCarthy ............ G01K 7/32 |
| | | 374/117 |
| 2009/0216498 A1 | 8/2009 | Seguin et al. |
| 2009/0218657 A1 | 9/2009 | Rofougaran |
| 2009/0243924 A1 | 10/2009 | Twitchell, Jr. et al. |
| 2009/0306920 A1 | 12/2009 | Zwinger et al. |
| 2009/0322585 A1 | 12/2009 | Galasso |
| 2010/0033386 A1 | 2/2010 | Lewis et al. |
| 2010/0035557 A1 | 2/2010 | Shellhammer |
| 2010/0039340 A1 | 2/2010 | Brown |
| 2010/0073229 A1 | 3/2010 | Pattabiraman et al. |
| 2010/0073665 A1 | 3/2010 | Zhao et al. |
| 2010/0097269 A1 | 4/2010 | Loidl et al. |
| 2010/0114216 A1 | 5/2010 | Krause et al. |
| 2010/0123453 A1 | 5/2010 | Pauly et al. |
| 2010/0125438 A1 | 5/2010 | Audet |
| 2010/0171446 A1 | 7/2010 | Retsky |

(56) References Cited

U.S. PATENT DOCUMENTS

| | | |
|---|---|---|
| 2010/0182189 A1 | 7/2010 | Jung et al. |
| 2010/0237854 A1 | 9/2010 | Kumhyr et al. |
| 2010/0241864 A1 | 9/2010 | Kelley et al. |
| 2010/0289686 A1 | 11/2010 | Jung et al. |
| 2010/0295552 A1 | 11/2010 | Li et al. |
| 2010/0315295 A1 | 12/2010 | Tucek et al. |
| 2010/0332199 A1 | 12/2010 | Dhanekula et al. |
| 2011/0068818 A1 | 3/2011 | Fukami |
| 2011/0095934 A1 | 4/2011 | Freeman et al. |
| 2011/0210829 A1 | 9/2011 | Kean |
| 2011/0235742 A1 | 9/2011 | London et al. |
| 2011/0246119 A1* | 10/2011 | Feix ............ G06F 21/755 702/117 |
| 2011/0270337 A1 | 11/2011 | Doerr et al. |
| 2011/0313651 A1 | 12/2011 | Hyde et al. |
| 2011/0320170 A1 | 12/2011 | Pathak et al. |
| 2012/0007982 A1 | 1/2012 | Giuffrida et al. |
| 2012/0019321 A1* | 1/2012 | Arnborg ........ H03K 3/3565 330/253 |
| 2012/0154213 A1 | 6/2012 | Bull et al. |
| 2012/0161762 A1* | 6/2012 | Zank ............ G01R 33/12 324/309 |
| 2012/0179812 A1 | 7/2012 | Keller, III |
| 2012/0223403 A1 | 9/2012 | Keller, III et al. |
| 2012/0226463 A1 | 9/2012 | Keller, III et al. |
| 2012/0297232 A1* | 11/2012 | Bircher ........ G06F 1/324 713/500 |
| 2012/0307947 A1* | 12/2012 | Kodama ........ H04B 1/0035 375/344 |
| 2013/0002502 A1* | 1/2013 | Wang ............ H01Q 7/00 343/793 |
| 2013/0015053 A1* | 1/2013 | Benveniste ....... H01J 37/32688 204/155 |
| 2013/0050010 A1 | 2/2013 | Nordlander |
| 2013/0082717 A1 | 4/2013 | Kim et al. |
| 2013/0137066 A1 | 5/2013 | Pollak et al. |
| 2013/0229310 A1 | 9/2013 | Parks et al. |
| 2013/0328710 A1 | 12/2013 | Keller, III |
| 2014/0043184 A1 | 2/2014 | Malaga |
| 2014/0117095 A1* | 5/2014 | Choi ............ G06K 19/07783 235/492 |
| 2014/0218229 A1 | 8/2014 | Pauly et al. |
| 2014/0250309 A1* | 9/2014 | Dietze .......... G06F 1/26 713/300 |
| 2014/0278214 A1 | 9/2014 | Broad et al. |
| 2014/0313071 A1 | 10/2014 | Mccorkle |
| 2014/0355774 A1* | 12/2014 | Quan .......... H04R 29/00 381/58 |
| 2015/0009073 A1 | 1/2015 | Keller, III |
| 2015/0137830 A1 | 5/2015 | Keller, III et al. |
| 2015/0160181 A1* | 6/2015 | White .......... G01S 7/411 702/22 |
| 2015/0180495 A1* | 6/2015 | Klippel .......... H03M 1/0612 341/118 |
| 2015/0377941 A1* | 12/2015 | Benedikt .......... G01R 35/007 324/601 |
| 2016/0098561 A1* | 4/2016 | Keller .......... G06F 21/554 726/24 |
| 2016/0224094 A1* | 8/2016 | Klein .......... G06F 1/26 |
| 2016/0359569 A1* | 12/2016 | Dailey .......... H04B 10/90 |
| 2017/0134877 A1* | 5/2017 | Faller .......... H04S 7/302 |
| 2017/0289786 A1* | 10/2017 | Dishon .......... H04W 8/005 |
| 2018/0096779 A1* | 4/2018 | Tsai .......... H01F 41/04 |
| 2018/0182279 A1* | 6/2018 | Sakariya .......... G09G 3/2014 |
| 2018/0290549 A1* | 10/2018 | Forsberg .......... B60L 5/045 |

FOREIGN PATENT DOCUMENTS

| | | |
|---|---|---|
| JP | 06011530 | 1/1994 |
| JP | H11174130 | 7/1999 |
| JP | 2000076387 | 3/2000 |
| JP | 2003503679 | 1/2003 |
| JP | 2004245709 | 9/2004 |
| JP | 2011174709 | 9/2011 |
| JP | 2012026913 | 2/2012 |
| KR | 20090092515 | 9/2009 |
| KR | 101077441 | 10/2011 |
| WO | 2009047585 | 4/2009 |
| WO | 2015134148 | 9/2015 |

OTHER PUBLICATIONS

Leopoldo Angrisania, Identification and classification of transformers current transients through Huang Hilbert Transform, Date Feb. 2, 2018, p. 127 Fig 7. Retrieved from: https://www.sciencedirect.com/science/article/pii/S0263224118303622?via%3Dihub.*

Tektronix, Differential Oscilloscope Measurements, Copyright 1996, p. 9 Fig 11. Retrieved from: https://studylib.net/doc/18881579/differential-oscilloscope-measurements#.*

Ashwin Lakshminarasimhan; Electromagnetic Side-Channel Analysis for Hardware and Software Watermarking; Sep. 2011; submitted to the Graduate School of the University of Massachusetts Amherst.

William E. Cobb et al.; Intrinsic Physical-Layer Authentication of Integrated Circuits; IEEE Transactions on Information Forensics and Security, vol. 7, No. 1 Feb. 2012.

Y.P. Zhang, Duixian Liu; Antenna-on-Chip and Antenna-in-Package Solutions to Highly Integrated Millimeter-Wave Devices for Wireless Communications, 2009, vol. 57 No. 10.

Walter J. Keller and Bogdan Pathak; Advanced Detection of Electronic Counterfeits; Apr. 19, 2013; Nokomis, Inc.

John H. Marburger, III; Research Challenges in Combating Terrorist Use of Explosives in the United States; Subcommittee on Domestic Improvised Explosive Devices; Dec. 2008.

U.S. Department of Justice; Enhanced Tools for Improvised Explosive Devices (IED) and Vehicle Borne IED Defeat; Oct. 2005.

* cited by examiner

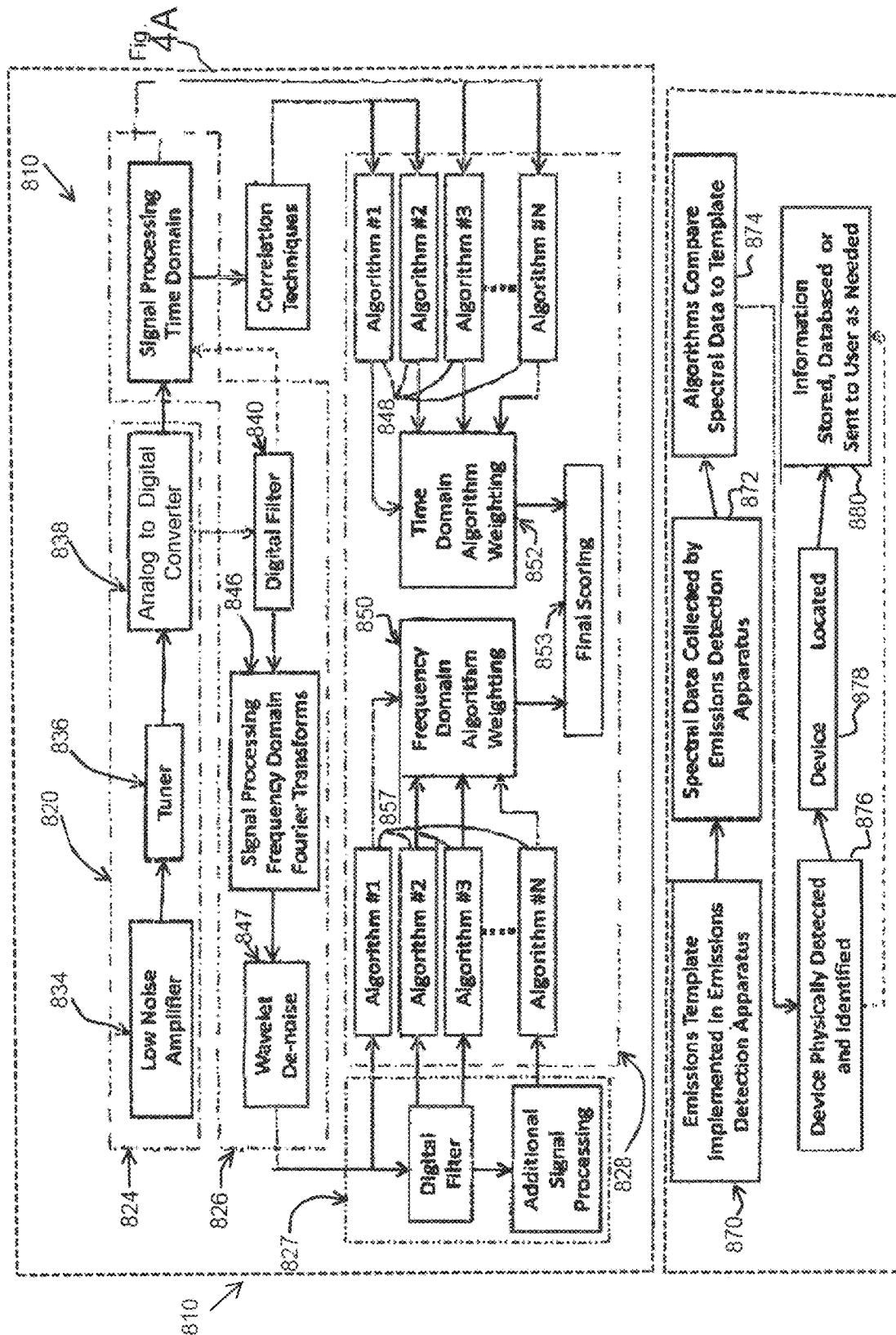

SYSTEM AND METHOD FOR PHYSICALLY DETECTING, IDENTIFYING, AND DIAGNOSING MEDICAL ELECTRONIC DEVICES CONNECTABLE TO A NETWORK

CROSS-REFERENCE TO RELATED APPLICATIONS

This present non-provisional patent application is related to and claims benefit of and priority from U.S. Provisional Patent Application Ser. No. 62/630,786 filed on Feb. 14, 2018, the entire contents of which are hereby incorporated by reference thereto.

This document incorporates, in their entirety, by reference the disclosures and/or teachings of the following documents: U.S. Pat. No. 7,515,094 B2 issued on Apr. 7, 2009 and entitled "Advanced electromagnetic location of electronic equipment"; U.S. Pat. No. 8,063,813 B1 issued on Nov. 22, 2011 and entitled "Active improvised explosive device (IED) electronic signature detection"; U.S. Pat. No. 8,537,050 B2 issued on Sep. 17, 2013 and entitled "Identification and analysis of source emissions through harmonic phase comparison"; U.S. Pat. No. 8,643,539 B2 issued on Feb. 4, 2014 and entitled "Advance manufacturing monitoring and diagnostic tool"; U.S. Pat. No. 8,825,823 B2 issued on Sep. 2, 2014 and entitled "System and method for physically detecting, identifying, diagnosing and geolocating electronic devices connectable to a network"; U.S. Pat. No. 9,205,270 B2 issued on Dec. 8, 2015 and entitled "METHOD AND APPARATUS FOR THE DIAGNOSIS AND PROGNOSIS OF ACTIVE IMPLANTS IN OR ATTACHED TO BIOLOGICAL HOSTS OR SYSTEMS"; U.S. Pat. No. 9,059,189 B2 issued on Jun. 16, 2015 and entitled "INTEGRATED CIRCUIT WITH ELECTROMAGNETIC ENERGY ANOMALY DETECTION AND PROCESSING"; U.S. Pub. No. 20120226463 A1 published on Sep. 6, 2012 and entitled "SYSTEM AND METHOD FOR PHYSICALLY DETECTING COUNTERFEIT ELECTRONICS", now issued as U.S. Pat. No. 10,475,754 B2 on Nov. 12, 2019; U.S. Pat. No. 9,658,314 B2 issued on May 23, 2017 and entitled "SYSTEM AND METHOD FOR GEO-LOCATING AND DETECTING SOURCE OF ELECTROMAGNETIC EMISSIONS"; U.S. Pub. No. 20130328710 A1 published on Dec. 12, 2013 and entitled "IDENTIFICATION AND ANALYSIS OF SOURCE EMISSIONS THROUGH HARMONIC PHASE COMPARISON", now issued as U.S. Pat. No. 10,416,286 B2 on Sep. 17, 2019; U.S. Pat. No. 9,285,463 B1 issued on Mar. 15, 2016 and entitled "Method and Apparatus for Battle Damage Assessment of Electric or electronic Devices and Systems"; U.S. Pat. No. 9,851,386 B2 issued on Dec. 26, 2017 and entitled "Method and Apparatus for Detection and Identification of Counterfeit and Substandard Electronics", U.S. Pat. No. 9,797,993 B2 issued on Oct. 24, 2017 and entitled "Advance Manufacturing Monitoring and Diagnostic Tool"; PCT Pub. No. WO2015/134148 A1 published on Sep. 11, 2015 and entitled "METHOD AND APPARATUS FOR DETECTION AND IDENTIFICATION OF COUNTERFEIT AND SUBSTANDARD ELECTRONICS", U.S. Pat. No. 9,562,962 B2 issued on Feb. 7, 2017 and entitled "System and Method for Physically Detecting, Identifying, Diagnosing and Geolocating Electronic Devices Connectable to a Network"; and U.S. Pub. No. 20160098561 A1 published on Apr. 7, 2016 and entitled "DETECTION OF MALICIOUS SOFTWARE, FIRMWARE, IP CORES AND CIRCUITRY VIA UNINTENDED EMISSIONS", now issued as U.S. Pat. No. 10,395,032 B2 on Aug. 27, 2019.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates to protection of electronic devices. The subject matter may relate to protection of medical electronic devices connected to a data bus or network. The subject further matter may relate to medical electronic devices protection from cyber and cyber-physical attacks.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present subject matter, or any embodiments thereof, to anything stated or implied therein or inferred thereupon.

Complex medical electronic devices can be critical to the safety and wellbeing of medical patients, dispersing medicine, controlling medical records, and diagnosis of complex medical issues. Adversarial intrusion or subversion of medical electronic devices' software and hardware can jeopardize diagnostic assurance, patient lives, and patient privacy and security.

The Food and Drug Administration has provided guidance for manufactures to implement solutions to mitigate cybersecurity risk and risk management. Current solutions to cyber-threats in medical devices can include software solutions that analyze incoming threats, to hardware solutions that isolate data storage to provide a physical barrier to medical records. These approaches cannot adequately answer the cyber threat currently facing the medical device community.

To ensure diagnostic integrity, patient privacy, and medical treatment success, the user, physician or nurse or manufacturer of the medical device can have an immediate need for a capability to verify and ensure the trustworthiness of critical medical electronic devices, embedded software, hardware, stored medical records or information, and methods to mitigate vulnerabilities or threats. Furthermore, the physician or nurse has a need to be able to detect cyber intrusion events or cases where electronic assets have been compromised or subverted by at least a cyber-attack or a cyber physical attack.

BRIEF DESCRIPTION OF THE DRAWINGS

The accompanying drawings are incorporated in and constitute part of the specification and illustrate various embodiments. In the drawings:

FIG. 4A-4B shows detailed software and hardware components, in a block form, of the exemplary device of FIG. 2;

DETAILED DESCRIPTION OF EXEMPLARY EMBODIMENTS

Figure 1:
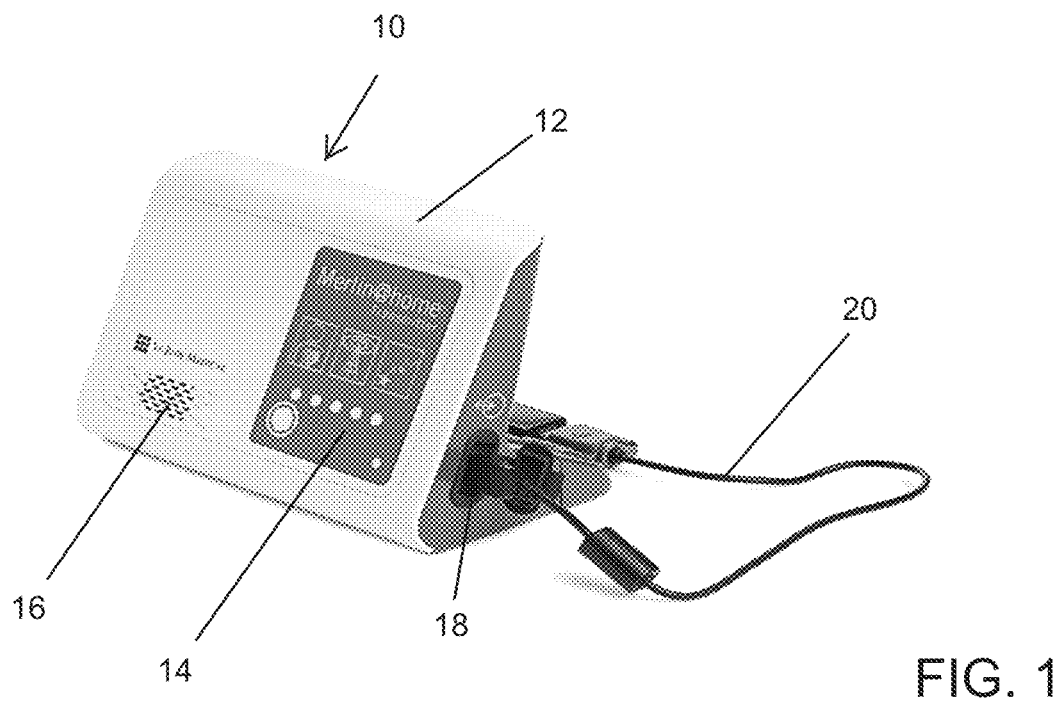
FIG. 1 illustrates an exemplary medical device.

Prior to proceeding to the more detailed description of the present subject matter, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

The terms and words used in the following description and claims are not limited to the bibliographical meanings, but, are merely used to enable a clear and consistent understanding of the exemplary embodiments. Accordingly, it should be apparent to those skilled in the art that the following description of exemplary embodiments are provided for illustration purpose only and not for the purpose of limiting the invention as defined by the appended claims and their equivalents.

Furthermore, there is no intention to be bound by any expressed or implied theory presented in the preceding technical field, background, or the following detailed description. It is also to be understood that the specific devices and processes illustrated in the attached drawings, and described in the following specification, are simply examples of the inventive concepts defined in the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The term "or" when used in this specification and the appended claims is not meant to be exclusive; rather the term is inclusive, meaning either or both.

It is to be understood that the singular forms "a," "an," and "the" include plural referents unless the context clearly dictates otherwise. Thus, for example, reference to "a component surface" includes reference to one or more of such surfaces.

Term "unintended electromagnetic emissions of RF energy" or "unintended emission(s)" when used herein is intended to mean signals that are emitted by electrical and/or electronic devices and/or their components and that are often lie within the noise band. Term "unintended emission(s)" can be considered herein to be not only emissions emitted unintentionally by the device or system contrary to the intent and objective of the device, system, or its designers, but also unintended properties of intended emissions of the device or system. Term "unintended emission(s)" can further refer to electromagnetic energy that is captured and analyzed which is not directly produced by the intended functionality of the device. A non-limiting example of the unintended emissions may be electromagnetic energy that radiates from traces, wires and/or connection nodes when the electrical or electronic device is coupled to a power source and is simply powered ON.

Conversely, term "intended emission(s)" refers to electromagnetic energy that is captured and analyzed by the apparatus which is a direct result of the intended functionality of the device, such as for example the carrier signal of an FM transmitter. Therefore, the intended digital data contained in an intended digital transmission would not be considered unintended, however other aspects of the intended signal such as harmonics, phase noise, frequency stability, out-of-band signal content, amplitude deviation, bit duration times, etc. could be deliberately used by the system for information content to be conveyed to the user.

Term "signature" when used herein is intended to mean a constructed combination-construction of two or more components of a single artifact, two or more components of multiple artifacts or a single component of a single artifact.

The term "artifact" when used herein refers to its definition as "something observed in a scientific investigation or experiment that is not naturally present but occurs as a tangible and/or measurable result of the preparative or investigative procedure".

In other words, term "artifact" is intended to mean herein an emission characteristic (signature element) that is generated by the device due to application or coupling of RF energy with highly specific frequency(s), wavelength, amplitude, phase, polarization, location, orientation, waveform and/or other characteristics to the device. Artifacts created may include, without limitation, component(s) such as EM wave, frequency feature, for example such as shift, non-linear response, peak location, relative dB height, peak width, harmonic spacing(s) between peaks in a single emission spectral, phase noise present, relationships, for example such as spacing(s) between peeks, in multiple unintentional frequency emissions arising and present, EM polarizations, peak skewness, cross modulation peak characteristics, and magnitude of the noise floor, and power differences between peaks, etc. More specifically, the exemplary embodiments focus on frequency feature unintentionally (not intended by the manufacturer) generated and re-emitted due to illumination with RF energy. As an example, the peak location and relative dB height of new peaks appearing as a result of and far from a fundamental single illumination frequency would be derived and by-product of the design and constructions of the device and hence be considered a frequency artifact(s).

The term "threat" or "adversarial attack" when used herein refers, without limitation, to at least one of cyber intrusion attempt, cyber-attack, cyber-physical attacks, malware, physical malware, tamper, malicious software, anomalous software, modified software, malicious firmware, anomalous firmware, modified firmware, malicious circuitry, anomalous circuitry, modified circuitry, cyber-physical attack, compromised said electronic systems connected to the data line, aged electronics, faulty electronics.

The particular embodiments of the present disclosure can be focused on emissions of unintended electromagnetic energy and, more particularly, the emissions of unintended electromagnetic energy being in a Radio Frequency (RF) spectrum, which is typically referred to in the art as frequencies below 300 GHZ, although infrared, infrasonic and other emissions are also contemplated by the exemplary embodiments.

The particular embodiments of the present disclosure generally provide apparatus and method directed to detecting an anomaly within a medical apparatus at least comprising one or more processing devices, a data transmission connection to a network, triggering an alarm or disabling operation of the medical apparatus when anomaly is detected, and, as a whole, protecting medical apparatus.

The particular embodiments of the present disclosure can be focused on emission(s) of electromagnetic energy and, more particularly, the emission(s) of electromagnetic energy being in a Radio Frequency (RF) spectrum, which is typically referred to in the art as frequencies above 3 kHz and below 300 GHZ, although infrared, infrasonic, and other emissions can be also contemplated by the exemplary embodiments. The forgoing description will be focused on intended and unintended features of intended emission(s) of electromagnetic energy.

Emissions phenomenology, especially unintended emission(s), is causally dependent on its internal circuitry, and manifests as well-defined signatures, in the time domain, frequency domain, or both, that can be classified by identifying characteristic signature parameters and metrics associated with altered or additional functionality. Here functionality is describes as the current working condition of the device, and can be referred to as operational, aged to a degree, likely to imminently fail, or beyond useful life. Term "operational" when used herein means that the device is in full specified working order, with no functional hardware flaws and fully functioning subcomponents. Altered or additional functionality refers to deviations from operational status that damage, degrade, or otherwise change the performance of the electronic device.

The particular embodiments of the present disclosure can be directed to improvement of detection of the anomaly within the electronic apparatus, for example such as a medical apparatus.

The particular embodiments of the present disclosure can be directed to improving an electronic apparatus, for example such as a medical apparatus and, more particularly, such as a transmitter for remote care management.

The particular embodiments of the present disclosure can be also directed to improving operation of the electronic apparatus.

The term "network" refers to a communication path between two or more devices using a previously determined protocol for communication. The network may be based on standards or may be proprietary to a particular embodiment. It may use a variety of physical media, including but not limited to, radio frequency propagation through the air, wire connections, optical communication through the air or through optical fiber, signals coupled to electrical power lines, and magnetically coupled communication.

Every electrical and electronic device or an electronic component necessarily sends Input and Output (I/O) signals and the generation of those signals and the signals themselves create unintended radiated emissions and unintended conducted emissions of a digital and analog nature as well as noise signatures. In addition, to signature creation in the conducted domain the electronics also gives off electromagnetic emissions that can be intended or unintended simply by operating or when being only powered on. The power that powers on the electronics can be external commercial power, battery power, medical power or internal power generation mechanisms. Thus, the signature of the conducted and electromagnetic emissions given off is a property of any electronic device and furthermore can be used indirectly to determine and predict the state of the electronic device.

It has been found, that non-linear attachments, resulting from data bit stream signal mixing with complex interactions, cause weaker or lower frequency emissions of RF energy then emissions from the clocks, the processing devices or any other electronic components within the medical apparatus.

The characteristics of these non-linear attachments, which manifest in the frequency-domain as cross modulation products can be described (examined/analyzed) by an amplitude modulation (AM) or a frequency modulation (FM), or both.

AM can be described by Eq. 1 below.

$$s(t) = A_c [1 + g_{mod}(t)] \cos(2\pi f_c t) \quad \text{Eq. 1}$$

where:
s(t) is an overall modulated signal,
$A_c$ is an Amplitude of the carrier signal,
g_mod(t) is an Amplitude Modulating (AM) waveform, and
$f_c$ is a frequency of the carrier signal.

Eq. 2 describes the case where g_mod(t) is sinusoidal:

$$s(t) = \frac{A_c}{2}\cos(2\pi f_c t) + \frac{A_{CM}}{2}\cos(2\pi(f_c + f_{CM})t) + \frac{A_{CM}}{2}\cos(2\pi(f_c - f_{CM})t) \quad \text{Eq. 2}$$

where:
$A_c$ is an Amplitude of the carrier signal,
$A_{cm}$ is an Amplitude of the modulating signal, and
$f_{cm}$ is a Frequency of the modulating signal.

If the signal is non-sinusoidal, additional harmonic sidebands can be generated at $f_c+2f_{CM}$, $f_o+3f_{CM}$, etc.

Figure 8A:
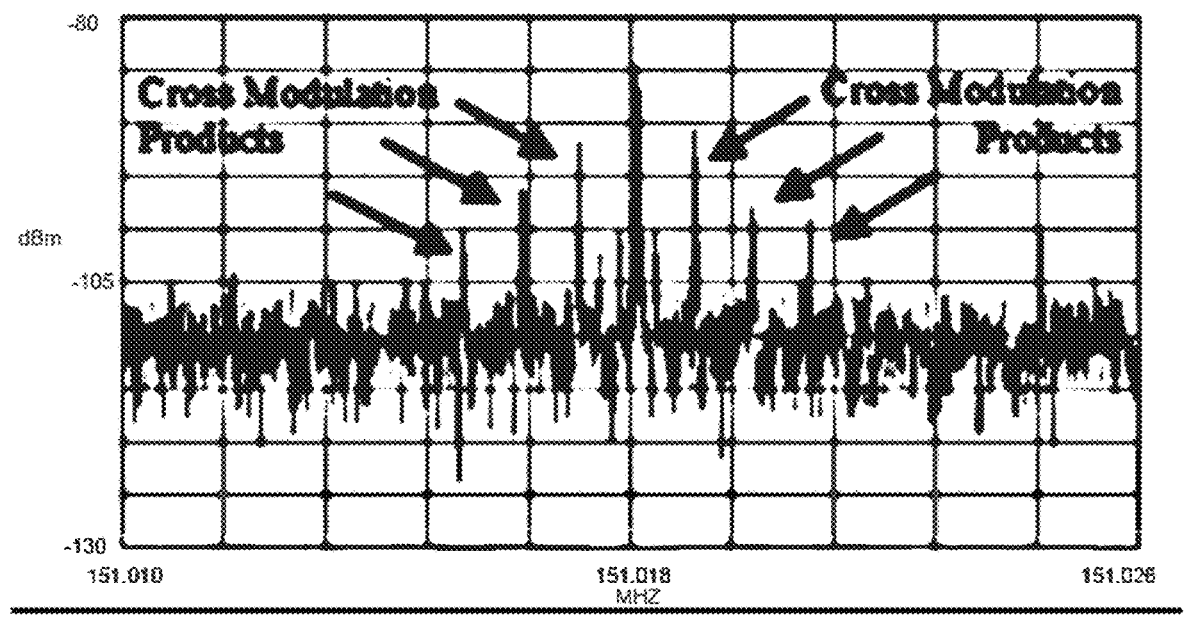
FIGS. 8A-8B illustrate cross modulation, pulse stream attached clock harmonic.
Figure 8B:
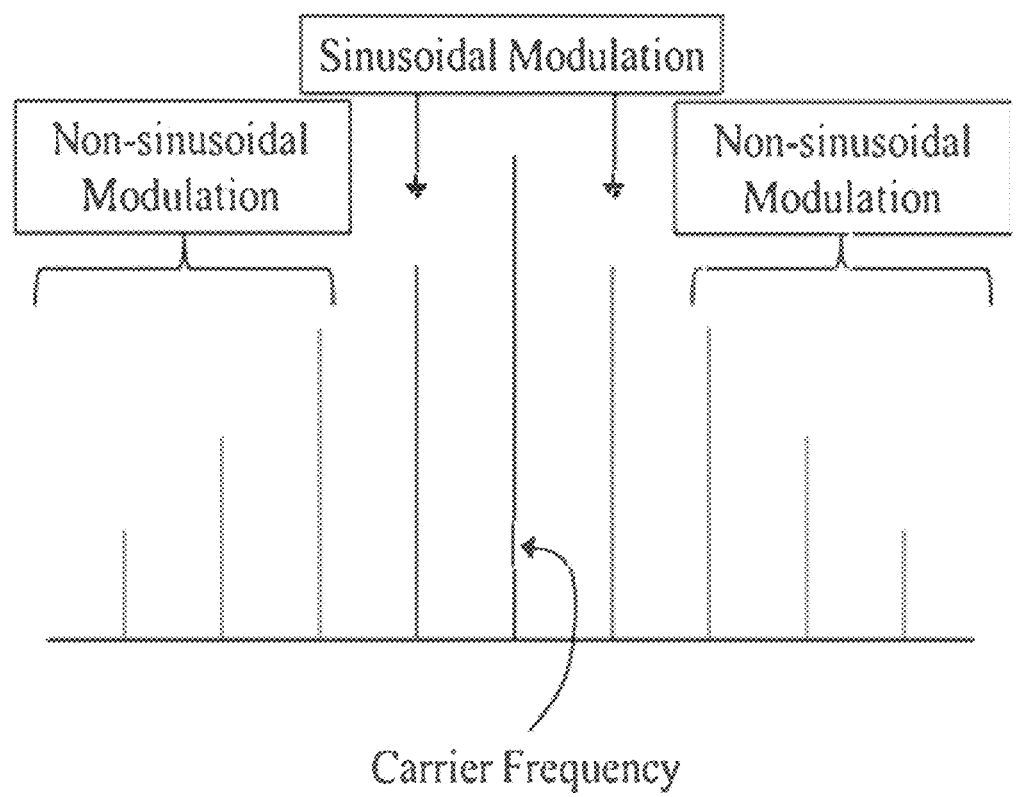

In a reference to FIGS. 8A-8B, any digital waveform can be thought of as time varying, non-sinusoidal AM carrier. The information contained in that data bit stream (either internal or external) will mix via cross modulation non-linear coupling to other system clocks resulting in an emission signature generally illustrated in FIGS. 8A-8B.

When a signal is modulated via AM or FM, the amplitude and frequency of the signal is changed in response to information; i.e., for frequency modulation the signal frequency is $f_1$ during logic state 1 of a data bit stream, and $f_0$ during logic state 0. The general expression for a modulated signal can be written as:

$$v_M(t) = A_c \cos(2\pi[f_c + g_{mod}(t)\Delta f]t) \quad \text{Eq. 3}$$

where:
$\Delta f$ is an absolute value of difference between two frequencies ($f_0$ and $f_1$), and
$v_M(t)$ is an overall modulated signal.

For a modulating signal $g_{mod}(t)=\cos(2\pi f_m t)$, and Eq. 3 can be expanded using Bessel trigonometric identities, shown in Eq. 4. The nth order Bessel Function of the first kind governs mixing characteristics such as frequency separation, amplitude envelope of peaks comprising the emitted signature of cross modulation products.

$$S(t) = A\sum_{-\infty}^{\infty} J_n(\beta)\cos[(\omega + n\omega_{mod})t] \quad \text{Eq. 4}$$

$$\beta = \frac{\Delta f}{f_b} = \frac{|f_0 - f_1|}{f_b}$$

where:
A is an overall amplitude,
$\omega$ is a frequency,
$\Delta f$ is an absolute value of difference between two frequencies ($f_0$ and $f_1$),
$\beta$ is the modulation index, and
$f_b$ is the bit rate.

Figure 9:
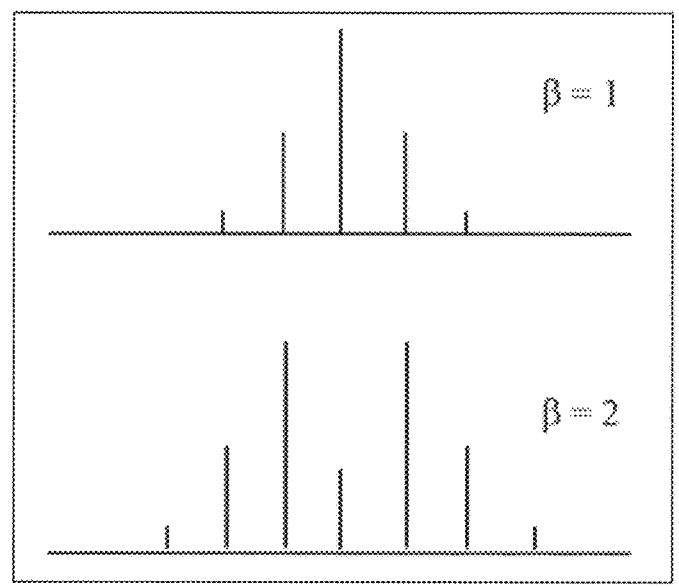
FIG. 9 illustrates an exemplary modulation products.

The Bessel function can be viewed as a superposition of amplitude modulated tones. The value of $\beta$ governs the shape of the modulation product envelope and the amplitude of individual cross modulation products, as shown in FIG. 9. When AM is applied, $\beta$ is also directly related to the characteristics of the bit stream, as it is proportional to $\Delta f$ ($f_0$ and $f_1$), and inversely proportional to the bit rate.

Therefore, a strong physical relationship exists between the characteristics of the emission signature and the information state of the computational system. This enables the real-time monitoring of cyber information that is critical to system health and status, as well as the reliable detection of cyber-attacks. Malicious changes to the data bit stream and machine instructions that result in an altered bit rate or a change in pattern will directly manifest in a detectable change in the cross-modulation envelope patterns. $\beta$, when reconstructed from the emissions envelope, can determine pulse train characteristics and hence the current cyber information state of the device.

In addition to cross modulation relationships, other linear and non-linear mixing products can change when programming changes are made. Programming changes can load circuits differently resulting in subtle frequency shifts at clock frequencies. Another exploitable feature to be examined/analyzed is a phase noise. The "phase noise" is to be understood herein as a frequency domain representation of rapid, short-term, random fluctuations in the phase of a waveform, caused by time domain instabilities ("jitter"). Phase noise attaches to frequency peaks throughout the device emission spectrum. Determination of a spectrum of the phase noise generated by small sinusoidal currents can be approximated by Eq. 5:

$$\phi(t) \approx \frac{I_m C_m \sin(\Delta\omega t)}{2q_{max}\Delta\omega}, \Delta\omega \ll \omega_0 \quad \text{Eq. 5}$$

where:
$I_m$ is amplitude of the modulation current,
$C_m$ is amplitude of the modulation capacitance,
$q_{max}$ is the maximum charge on the capacitor in the modulated circuit,
$\Delta\omega$ is the frequency separation of the harmonics, and
$\omega_0$ is a fundamental frequency.

Extrapolating to power, Eq. 6 gives us the expected power for small sinusoidal currents, with Eq. 7 extending this approximation to general white noise sources.

$$P_{SBC}(\Delta\omega) \approx 10\log\left(\frac{I_m C_m}{4q_{max}\Delta\omega}\right)^2 \quad \text{Eq. 6}$$

where:
$P_{SBC}(\Delta\Omega)$ is a noise power.

$$P_{SBC}(\Delta\omega) \approx 10\log\left(\frac{\frac{i_n^2}{\Delta f}\sum_{m=0}^{\infty} c_m^2}{4q_{max}^2 \Delta\omega^2}\right) \quad \text{Eq. 7}$$

Figure 10:
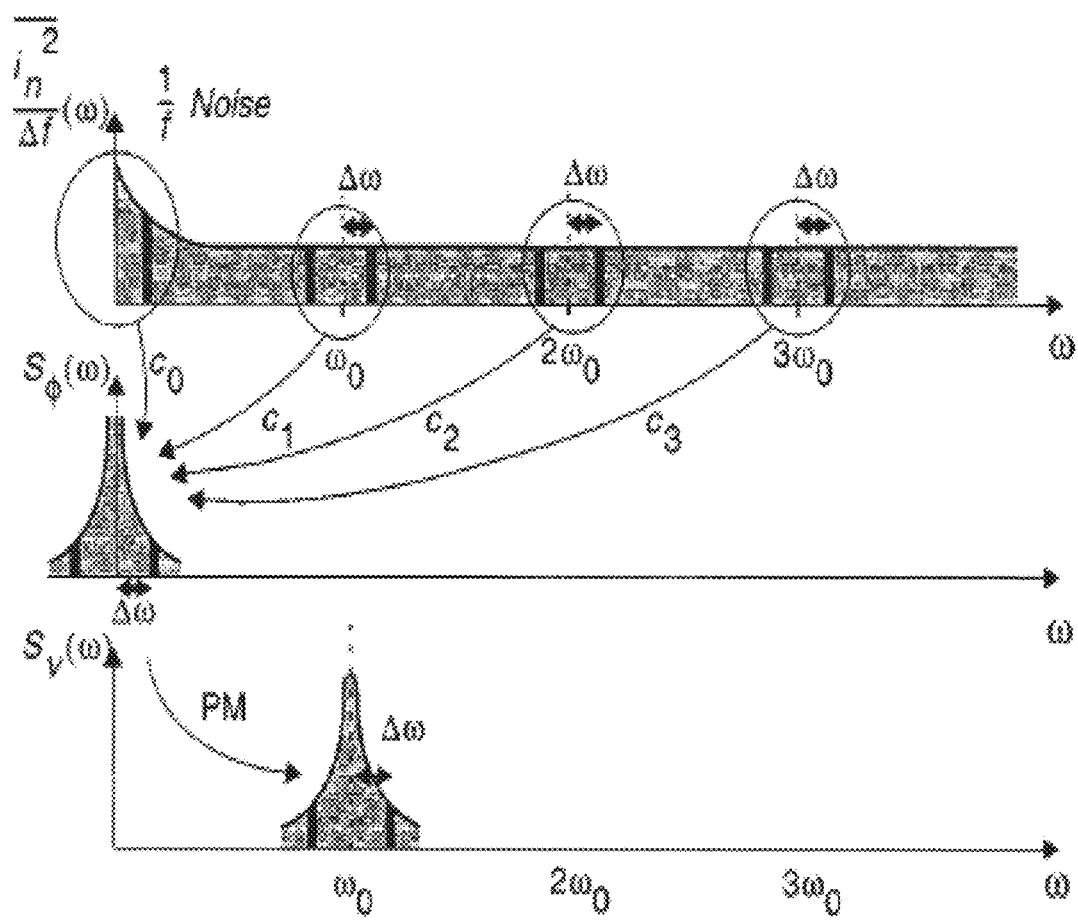
FIG. 10 illustrates an evolution of circuit noise into phase noise.

FIG. 10 shows the evolution of circuit 1/f noise into phase noise. Phase noise can be generated by circuitry within a processor that is not currently under use. These unused pathways create parallel ground pathways that primary oscillating or switching signals to couple to. Different levels of phase noise attachment are anticipated due to different resource utilization or distributions of instruction sets that are anticipated with malicious programming, providing an additional quantitative metric regarding the information state of the device.

Additional emission features which can provide exploitable information include: harmonic frequency shifting, total emitted energy, energy distribution and peak structure.

The subject matter will be illustrated further in a combination with a medical apparatus, for example such as a Merlin@Home™ transmitter 10 of FIG. 1. Generally, such transmitter 10 comprises a casing 12, a user interface 14, a speaker 16, and interface 18. A cable 20 can be also provided to connect the transmitter 10 to the network. Although not shown, the transmitter 10 contains one or more processing devices, clocks, connections between the one or more processing devices and clocks. As it has been described above, the transmitter 10 emits electromagnetic energy 3002.

In an exemplary embodiment, the device configured to detect, in a real-time manner, a presence or an absence of a cyber attack onto the transmitter 10 can be a stationary device 100 of FIGS. 2-4B. The device 100 can be positioned in a close proximity to the transmitter 10 and connected to an external antenna 586, although the antenna 586 can be integrated therewithin. Antenna 586 collects or captures intended and/or unintended emitted electromagnetic energy from the transmitter 10.

The device 100 can be configured as comprising a chassis 102, printed circuit board assemblies 104, 106, and 108 mounted on or inside the chassis 102, a power supply 110 mounted on or inside the chassis, an input/output assembly 112, a transceiver 120 coupled to the input/output assembly 112, and an optional forced air conduction cooling fan 124. The input/output assembly 112 comprises a member 120 that can be configured to be attached to and close one end of the chassis 102 and connectors 114, 116 and 118 extending from an exterior surface of the member 120. The connectors 114, 116 and 118 can be adapted with pins or sockets. The optional forced air conduction cooling fan 124, when provided, can close the opposite end of the chassis 102. If the optional forced air conduction cooling fan 124 is not provided, the opposite end of the chassis 102 can be closed with another member, for example being similar to the member 120 but without the connectors, or can be left open. Although the device 100 has been illustrated in FIG. 2, as comprising three circuit board assemblies 104, 106, and 108, it can be configured with one, two or four or more circuit board assemblies.

Figure 3:
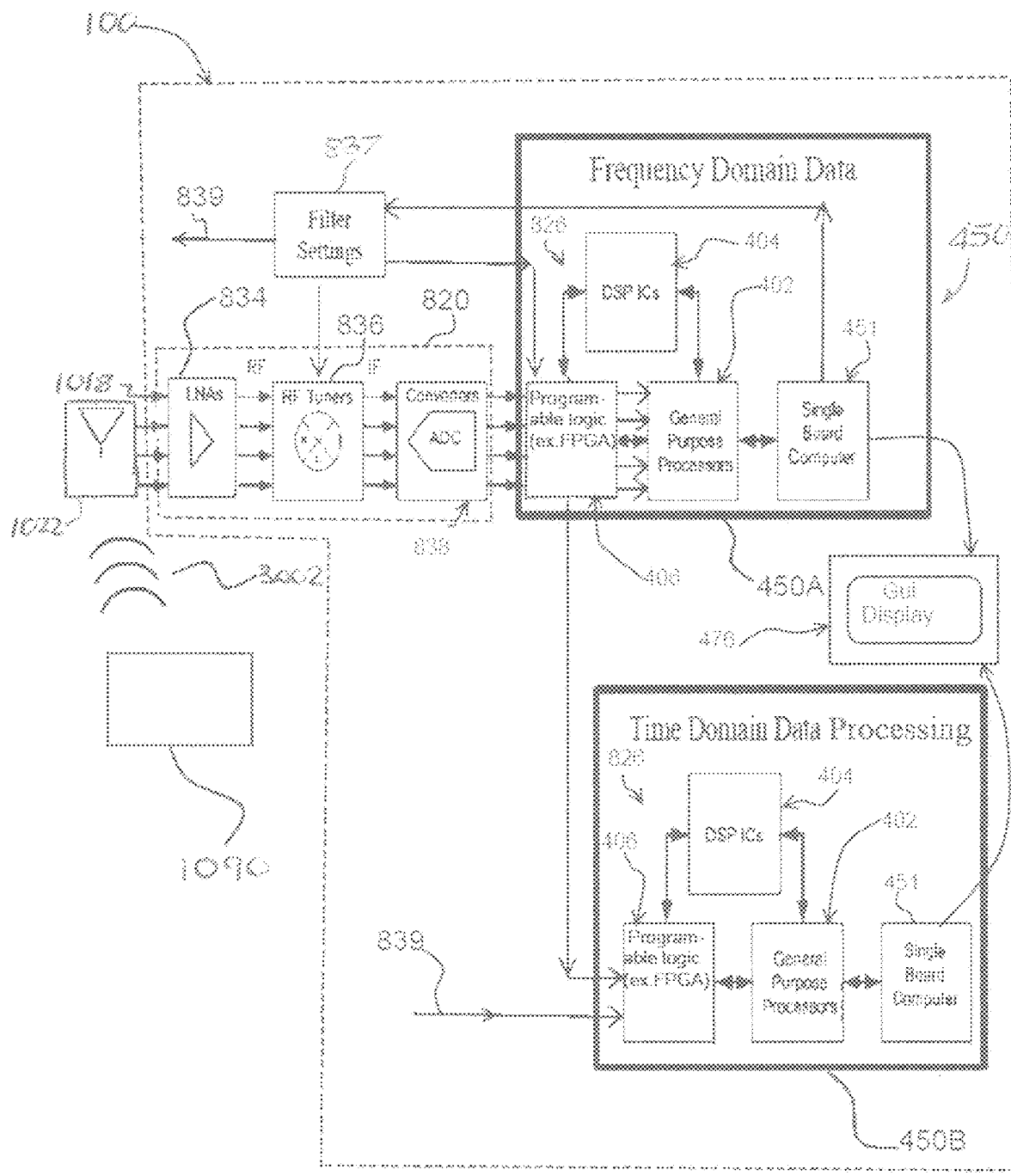
FIG. 3 illustrates an exemplary a schematic block diagram of the exemplary device of FIG. 2.

Now in a particular reference to FIGS. 3 and 4A, a subset of the device 100 is shown as apparatus 450 which includes an electromagnetic pattern sensor or a sensor 820 and a controller represented by time domain and frequency domain processing modules, 450A and 450B respectively, although either would provide needed discrimination functionality of varying capability and cost depending on the signature characteristics of the emissions radiated from the transmitter 10. The controller may be a computer loaded with the required algorithms, a circuit board assembly or a plurality of circuit board assemblies or any other controllers suitable for executing the instructions or logic algorithms.

The sensor 820 may be also referred in this document to as a receiver, an emissions acquisition assembly or an emissions pattern sensor.

The sensor 820 is configured to capture unintended emitted electromagnetic energy and/or unintended conducted energy from the transmitter 10. When the sensor 820 is configured to capture unintended emitted electromagnetic energy 3002 from the transmitter 10, the sensor 820 includes a low noise amplifier (LNA) 834, a tuner 836 and analog to digital converter (ADC) 838. The tuner 836 may be of RF tuner type. The sensor 820 can be a general receiver or tuner and the general receiver can be a heterodyne or super-heterodyne receiver or equivalent. The receiver 820 can be improved by providing a broadband response. Though one embodiment focuses on emissions from about 100 KHz to about 6 GHZ the bandwidth can be reduced to about 30 MHz to about 1 GHz to capture the majority of emissions from the devices coming in to the facility. The sensor 820 may be provided as a stand-alone device or a circuit board assembly.

The sensor 820 can be also configured to capture intended emitted electromagnetic energy.

Further sensitivity is achieved by lowering the noise figure of the system. In one embodiment, the sensor 820 has a modified front end with the Low Noise Amplifier (LNA) 834 with an ultra-low noise figure.

Each of the time domain and frequency domain processing modules, 450A and 450B respectively, includes one or more processors or logic devices, for example such as general purpose processor(s) 402 and programmable logic device 406 that may be a FPGA. Some FPGAs have logic employing multiple states that each have their own decision trees which the FPGA typically periodically cycles between. One exemplary embodiment is configured to examine each of the states in more detail and with less effective unrelated noise from adjacent states by employing a means to synchronize acquisitions in the time domain with the different states or sensed states.

To examine software based malware more effectively, an acquisition or analysis time window of emission signal input can be selected from a emission signal input stream, typically from the digitized analog time domain data before the Fast Fourier Transform (FFT) or even before the down conversion before the FFT, and which is pre-known or has been found to be associated with the execution of that software or a segment of that software. In this way, the specific malware to be found can be considered to be separated from the ongoing noise in the time domain, as compared with examination in more detail in the frequency domain.

DSP integrated circuit(s) (IC) 404 and a single board computer 451 may be also provided. There is also a computational medium comprising algorithms and/or executable instructions that, when executed by the one or more processors or logic devices, cause the one or more processors or logic devices to perform, in one exemplary embodiment, the following steps on the captured unintended emitted electromagnetic energy and/or the unintended conducted energy: measuring a feature value in at least one spectral frequency region of the captured unintended emitted electromagnetic energy and/or unintended conducted energy from the one or more electrical devices, calculating a difference value between the measured feature value and a baseline feature value, and determining, based on the calculated difference value, a presence or an absence of at least one of malicious software, anomalous software, modified software, malicious firmware, anomalous firmware, modified firmware, malicious circuitry, anomalous circuitry and modified circuitry within the one or more electrical devices.

A logic set of algorithms for comparing and matching the captured RF energy to a set of parameters identified for a baseline configuration of the operational transmitter 10 is best shown in FIG. 4A as the logic set 810. It would be understood that such logic set 827 is carried out by the at least one processor 402, though it also contemplates other hardware or firmware manifestations to assist or perform the comparison algorithms of verifying a match with the anticipated parameters such as Programmable logic device 406 or DSP IC 404.

Logic set 810 executes Fourier Transform 846 to convert the data in the digital filter 840 into the wavelet de-noise 847 for further processing in the logic set 827. At least one and plurality of algorithms 848, 850, 852, 853 and 857 in the logic subset 828 are executed to match the data collected to the expected signature for the transmitter 10. More than one algorithm may be used to match mutually exclusive parameters of the RF energy emission signature and then combine those using numerically weighted coefficients for each in a linear or nonlinear equation to yield a final overall score approximating the degree of match to an infected device. A machine learning approach, neural network or other approach may be used to assist or replace this. In this manner the ability to match the collected signature to the expected signature is improved. The weighting of these algorithms favorably improves the ability to detect modified or unmodified parts. One key factor in determining the quality of signal fed into the overall system it the linearity, number of bits (Effective Number of Bits (ENOB)) and speed of the ADC 838 converting the raw analog time domain voltages into digital values for processing. A higher ENOB for example generates less noisy data resulting in more accurate and/or faster modified/unmodified determination decisions.

Thus, logic set 810 can include at least one of Harmonic Analysis, Matched Filter, non-harmonic correlation, timing correlation, Artificial Neural Networks (ANN), specifically multilayer perception (MLP) feed-forward ANN with back propagation (BP), Wavelet Decomposition, Autocorrelation, Spectral Feature Measurements or Statistics, Clustering or Phase Detrending algorithms.

The configuration and/or operation of the apparatus 450 may be also in accordance with disclosures in the U.S. Pat. Nos. 7,515,094 and 8,063,813, both issued to Keller, III; in the U.S. Pat. No. 8,643,539 issued to Pauly on Feb. 4, 2014; and in U.S. Pat. No. 8,825,823 issued on Sep. 2, 2014 and entitled "System and Method for Physically Detecting, Identifying, Diagnosing And Geo-locating Devices Connectable To A Network", all owned by the assignee of the instant invention and whose teachings are incorporated herein by reference thereto.

The apparatus 450 may further comprise an antenna 1022 coupled to the sensor 820 and collecting the unintended emitted electromagnetic energy from the transmitter 10.

The apparatus 450 may further comprise a graphic user interface (GUI) display 476 in a communication with one or both time domain and frequency domain processing modules, 450A and 450B respectively, for example through the single board computer 451.

Filter setting 837 may be also provided with a connection 839 to the programmable logic device 406.

FIG. 4B illustrates an exemplary method that can be employed in locating a particular medical apparatus. The method starts with implementing emissions template in step 870, collecting/capturing the spectral data by the sensor 450 in step 872, comparing spectral data to template in step 874, detecting and even identifying transmitter 10 in step 876, physically locating transmitter 10 in step 878 and optionally storing or sending the obtained information in step 880.

Figure 5:
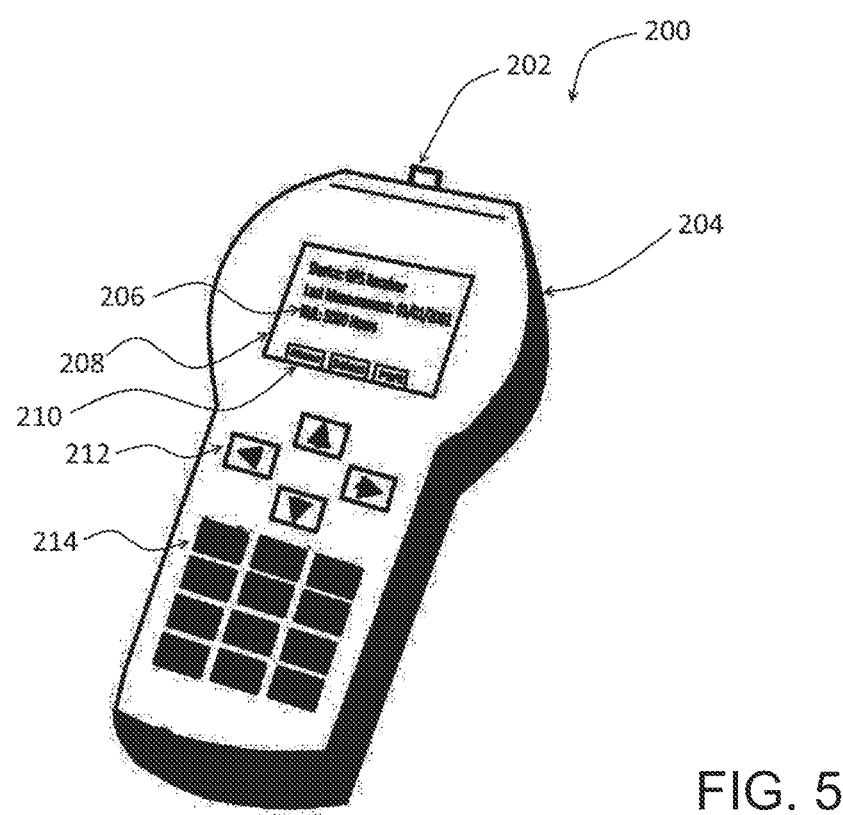
FIG. 5 illustrates exemplary device of FIGS. 2-4B implemented as a hand-held device.
Figure 2:
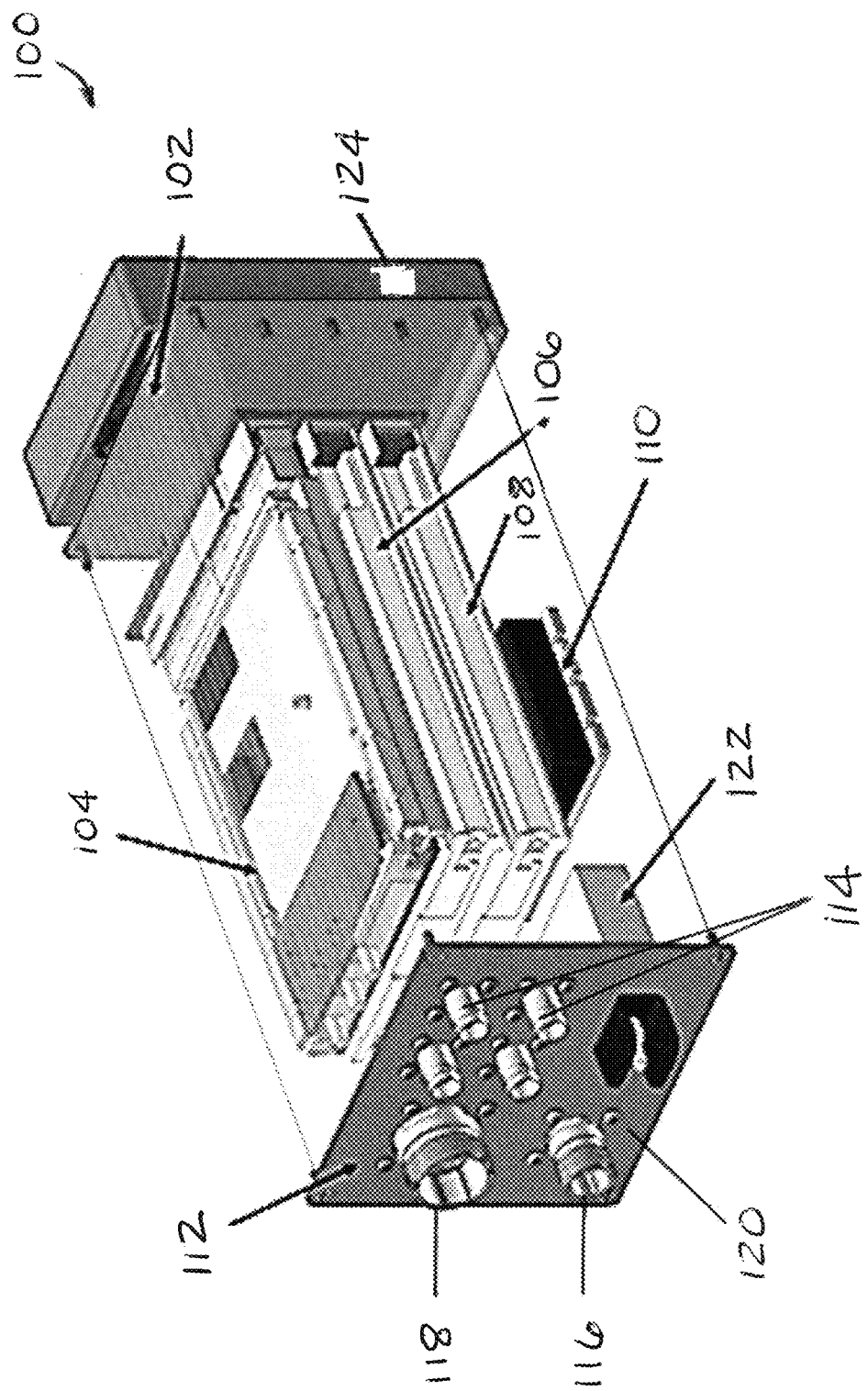
FIG. 2 illustrates an exemplary device for detecting anomaly in and/or cyber attack on an electronic device.

In an embodiment, the device configured to detect, in a real-time manner, a presence or an absence of a cyber attack onto the transmitter 10 can be a hand-held or a portable transmitter 10 of FIG. 5. The hand-held transmitter 10 can comprise a graphical user interface (GUI) 206 which shows exemplary data and information reported in human readable format. Example data shown in the graphical interface are the specific name of the medical device, the last date on which the previous measurement was acquired and the functional status result obtained from measuring and analyzing emissions from the medical device. The embodiment shown in FIG. 5 can also include a key-pad 214, arrow keys 212 and interactive menus 210 that can be accessed and scrolled through using the arrow keys and key-pad to, for example, select specific detailed functional status results from different specific spectral regions and signatures and hence known different electronic components within an overall medical device. Data acquired from and reported by the transmitter 10 can also be reported in machine-readable format. The graphical display may be in communication with one or both time domain and frequency domain processing modules.

The transmitter 10 shown in FIG. 5 also shows a possible connector 202 for attaching interchangeable antennas to collect RF emissions. Herein, interchangeable antennas refer to separate antennas that can be connected and disconnected at will from the hand-held device 200 via an RF cable. This connector 202 may be of the SMA-type, N-type, BNC-type, or other commonly used RF connection modality. From a hardware perspective, the transmitter 10 can be agnostic to the antenna connected to the connector 202. Such a suitable RF antenna may of sufficiently light weight and size as to attach directly to the front of the apparatus, be a floor-mounted antenna such as a log-periodic antenna, be a horn antenna, a conformal antenna, a spiral antenna, or be integrated in situ with an electrical device under test and accessible via appropriate RF connection.

Figure 6:
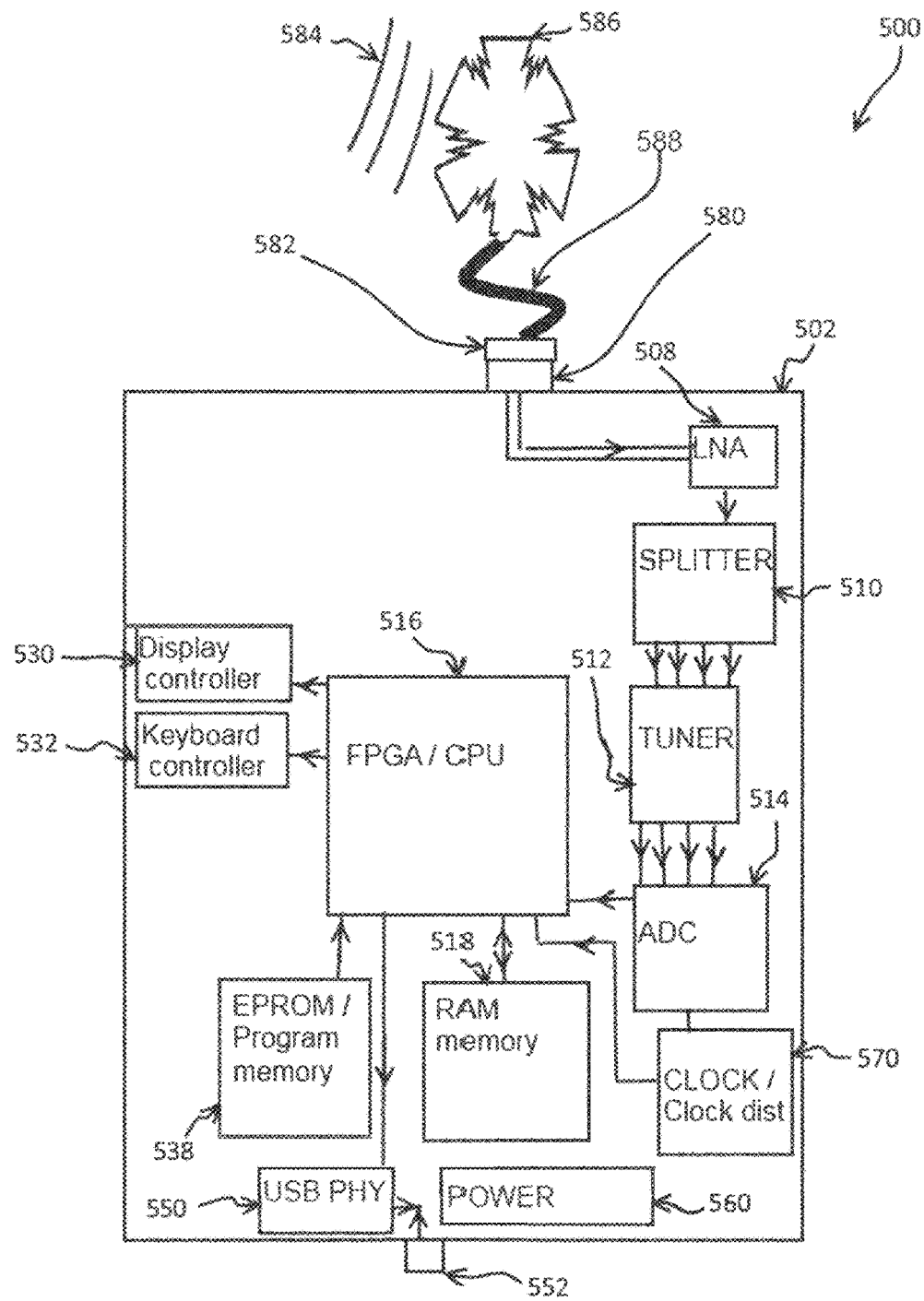
FIG. 6 illustrates an exemplary embodiments of the devices of FIG. 2 or 5 constructed as a single printed circuit board.

FIG. 6 provides a more detailed illustration of the hardware architecture which may be suitable for the transmitter 10. This architecture includes the LNA 508 as part of the overall RF receiver system 502. In this embodiment, a fractal antenna 586 is contemplated as one of the possible attached antennas to the device 100, with its cable 582 connected to the antenna connector 580. Additional embodiments contemplate the antenna being housed within the medical device. As discussed previously, this antenna can be interchanged with another suitable RF antenna.

The arrows between successive blocks in the diagram represent the signal path taken by the captured emissions from the antenna 586, through the LNA 508, splitter 510, tuner 512, ADC 514 into the FPGA/CPU 516. Here the splitter 510 is an RF splitter that equally routes the incoming signal into four channels of the device, typically to process different frequency regions by each channel. This is illustrated by the four arrows between the splitter 510 and the tuner 512. Each channel can represent a separate data throughput path. The FPGA/CPU 516 are chips typically used for down converting and FFT generation and also controls what is displayed on the graphical display 530 and controls the keypad 532, previously described. The FPGA requires a clock signal to maintain normal operation. This clock signal is provided as an on-board or co-located hardware block 570. Output from the FPGA can be provided through the USB PHY block 550 to an external connector 552 and externally connected USB device such as Flash memory, Ethernet hub, computer, database, or internet cloud storage. A non-volatile memory block 538 is also provided within the device as a means to store historical records of degradation values, and interfacing with a user. The random access memory block 518 may be an internal part of the computer, a removable external element coupled to the computer, or unit that is remotely accessible via a wired or wireless network. Power for the board is typically supplied in this embodiment via a chargeable or non-chargeable battery 560. Further embodiments contemplate power being supplied via a DC power supply.

The device 100 may connect, for example by using a MIL-STD-1553B bus specification, to a remote terminal, wherein the bus connection is drawn from a stub through a transformer. While this connection can be sufficient to support analysis of digital information and monitoring of faults across normal communication lines, the device 100 may additionally leverage unintended emissions information from LRUs that has attached to the data bus 1050 or data line(s) 1004 within the transmitter 10. To access this information, the device 100 may further comprise an analog data bus coupler or coupling device 1002, best shown in FIG. 7, as an integrated or a remotely positioned device. In other words, the device 100 can be configured to receive and process conducted emissions 1072 carried through the data bus 1050 from components or connections of the transmitter 10. The conducted emissions 1072 can be of common mode and/or differential mode. The conducted emissions 1072 could be intended or unintended.

Figure 7:
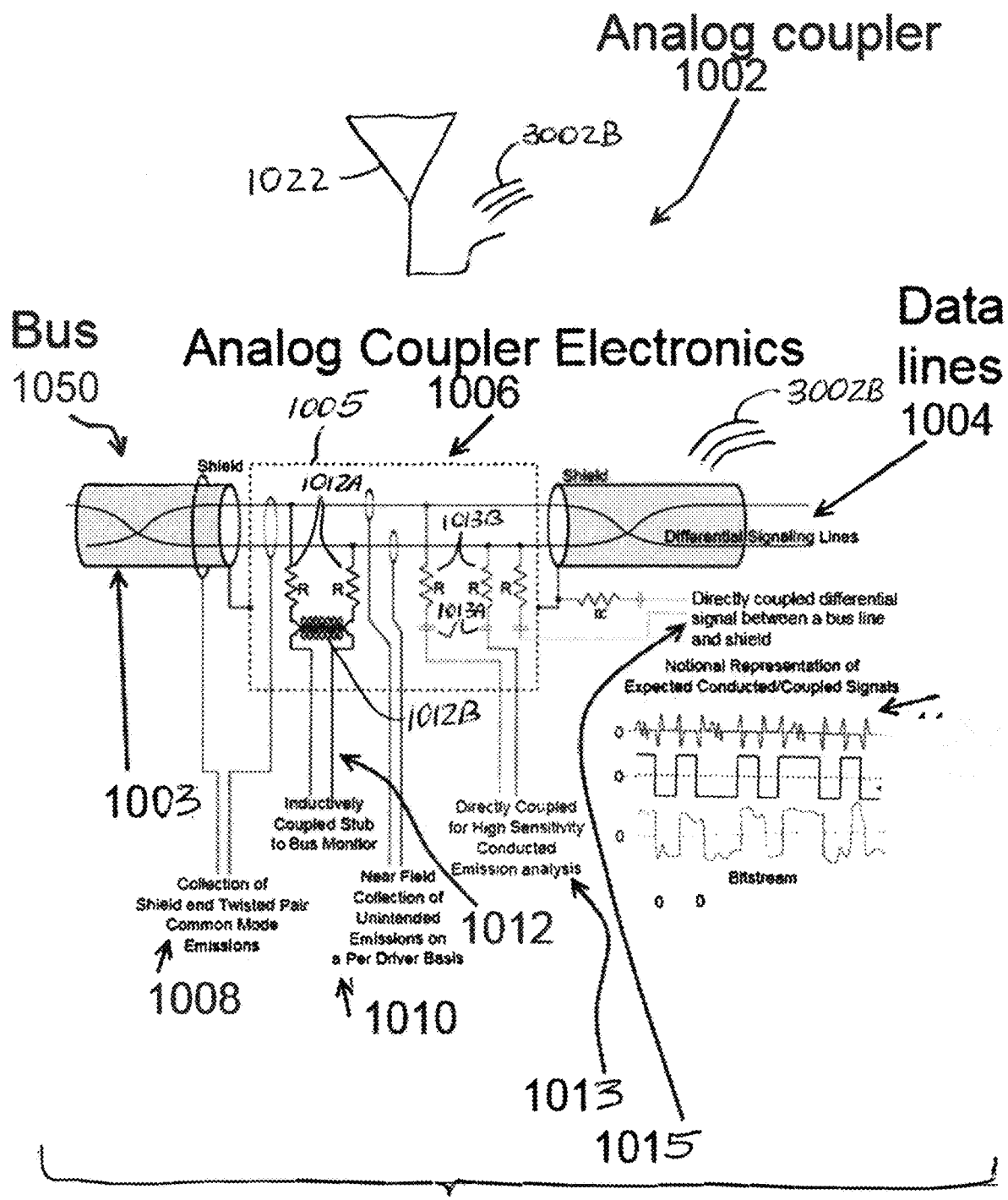
FIG. 7 illustrates an electrical block diagram of a hardware embodiment.

In a further reference to FIG. 7, the analog (signal) data bus coupler 1002 comprises a housing 1005 that is configured to pass data bus 1050 through or otherwise being mechanically coupled to the data bus 1050. The data bus coupler 1002 is also electrically coupled to the data bus 1050 by way of an analog couple electronics 1006 for the possible acquisition of analog unintended emissions from the bus in several forms as attempted. In a first connection 1008, one possible form of analog signal is acquired as a common mode difference in voltage or a difference in common mode current flow between shield 1003 and data lines 1004. In a second connection 1012, a second possible form of analog signal is acquired as a voltage differential between two signaling data lines 1004, inductively coupled and through appropriately isolated resistors 1012A and isolating transformer 1012B to ensure impedance matching. In a third connection 1010, a third possible form of analog signal is acquired as an individual near field emission of the data lines 1004 or as a difference between near field emissions of the data lines 1004. In a fourth connection 1013, a fourth possible form of analog signal is acquired as a direct capacitive coupled signal acquisition means using capacitors 1013A and resistors 1013B to either provide impedance matching or preferably to provide very high impedance as an isolation to not affect the data bus 1050. In a fifth connection 1015, a fifth possible form of analog signal is acquired as a typically high impedance isolating output to reference the voltage differential between the data line 1004 and the shield 1003. All forms may offer differing emissions signals and hence any one, several or all may be implemented, depending on the depth of sophistication and analysis desired, as well as the characteristics of the LRU coupling to the bus in unanticipated manners. As the unintended emission, circuitry effects and cable run configurations and locations may vary from installation to installation and aircraft to aircraft, some experimentation may be desired to obtain specific signals of interest present at highest levels potentially in some best forms or combination of forms. The different forms may be added or subtracted together to further extract and enhance signals of interest, depending on the complex and often unpredictable coupling of the unintended emissions.

Analog Coupler Electronics 1006 are typically shielded and housed in a mechanically suitable enclosure 1005, the whole comprising the Analog Coupler 1002.

In an aspect, a ground can be used instead of one of the differential input. Use of ground can reduce implementation cost.

Connections to the device 100 from the signal connection lines 1008, 1010, 1012, 1013, and/or 1015 may typically go through a shielded cable into one of the connectors on the input/output assembly 112, for example such the connector 118.

These signals are then appropriately processed through means such as LNA 834, Tuner 836, and/or ADC 838 for conversion and or analysis by device 100, such as conversion to the frequency domain using an FFT. Direct digital signal acquisition without a tuner is also envisioned herein, and digital downconversion may be performed inside a FPGA 406.

The data bus coupler 1002 can deliver additional information critical to robust cyber-physical security and electronic health monitoring applications as contemplated. The data bus coupler 1002 may include dedicated hardware 1008, 1010, 1012, 1013 and 1015 capable of acquiring differential and common mode RF unintended emissions that are present on the data bus 1050.

FIG. 7 also illustrates that the device 100 can be configured to receive and process/analyze emissions radiated from the same data bus 1050 and collected by the antenna 1022.

The data bus coupler 1002 can utilize a conductor current probe such as or similar to 1010 to capture radiated unintended emissions from each of the bus lines 1004 as well as the outer shield 1003. The probe is configured to focus on frequency ranges of greatest significance to CPS applications, which typically have been demonstrated to be the 1 MHz-3 GHz range. The data bus coupler 1002 may also include dedicated cabling to tie into the twisted pair 1004 in the data bus 1050 cabling to capture analog and digital information using standard data bus 1050 techniques that can be analyzed to support the Intrusion Detection system.

Figure 11A:
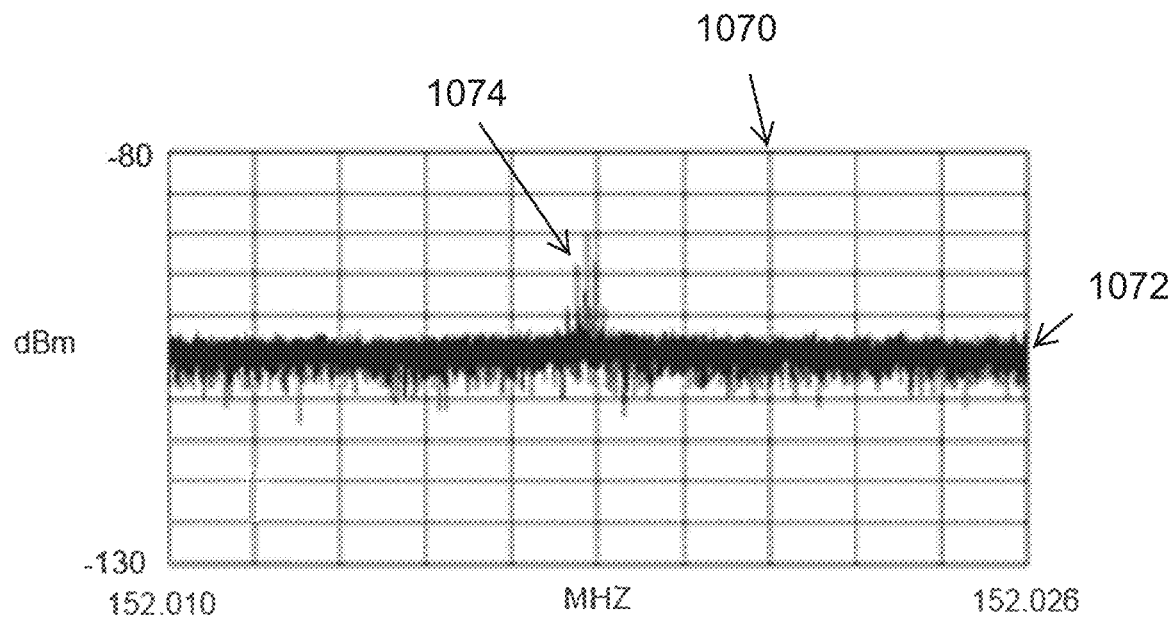
FIGS. 11A-11B illustrate two exemplary spectral features at the same frequency.
Figure 11B:
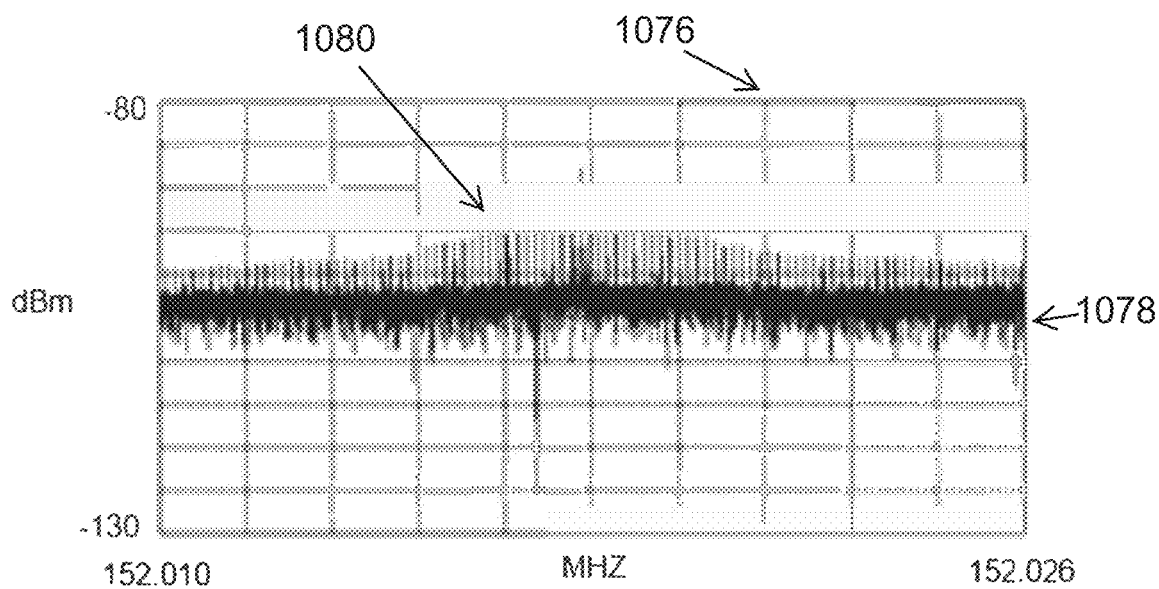

FIGS. 11A and 11B illustrate two spectral features at the same frequency, 152.018 MHz, that alternates between two manifestations of spectral features due to variation in the time domain data, in time. FIG. 11B illustrates an additional modulation signal added to the existing signal. The new manifestation can be described by Bessel Functions of the First kind.

Figure 12A:
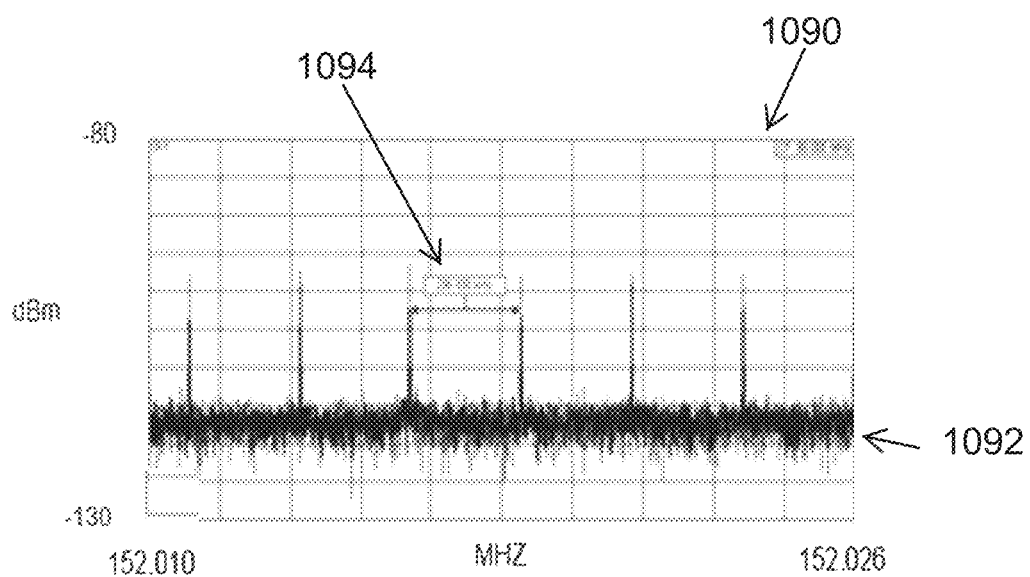
FIGS. 12A-12B illustrate two spectral features at the same frequency, 152.018 MHz, that alternate between two manifestations of spectral features due to variation in the time domain data, in time.
Figure 12B:
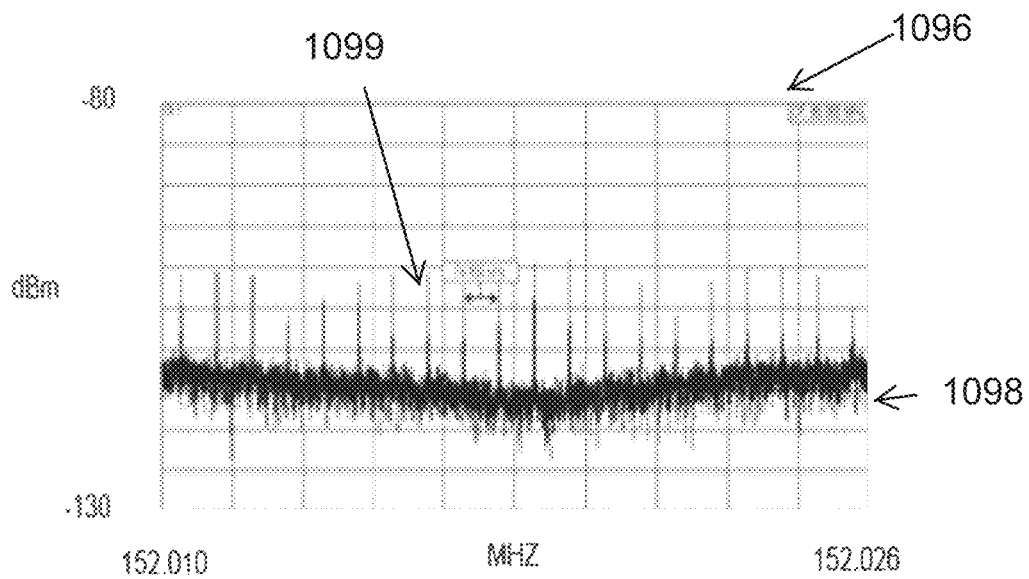

1070—Spectral feature at the first frequency of interest
1072—Noise floor
1074—Spectral feature at the first frequency of interest with a smaller number of non-linear mixing products
1076—Spectral feature at the second frequency of interest
1078—Noise floor
1080—Spectral feature at the second frequency of interest with a larger number of non-linear mixing products FIGS. 12A and 12B illustrate two spectral features at the same frequency, 152.018 MHz, that alternate between two manifestations of spectral features due to variation in the time domain data, in time. FIG. 12B illustrates a decrease in frequency spacing between harmonic features, as well as a localized decrease in the noise floor. This change can be caused by an increased frequency signal being transmitted. FIG. 12B also illustrates a curvature in the noise floor 1092

1090—Spectral feature at the first frequency of interest
1092—Noise floor
1094—Spectral feature at the first frequency of interest with a larger frequency separation between harmonic features
1096—Spectral feature at the second frequency of interest
1098—Noise floor
1099—Spectral feature at the second frequency of interest with a smaller frequency separation between harmonic features.

Figure 13A:
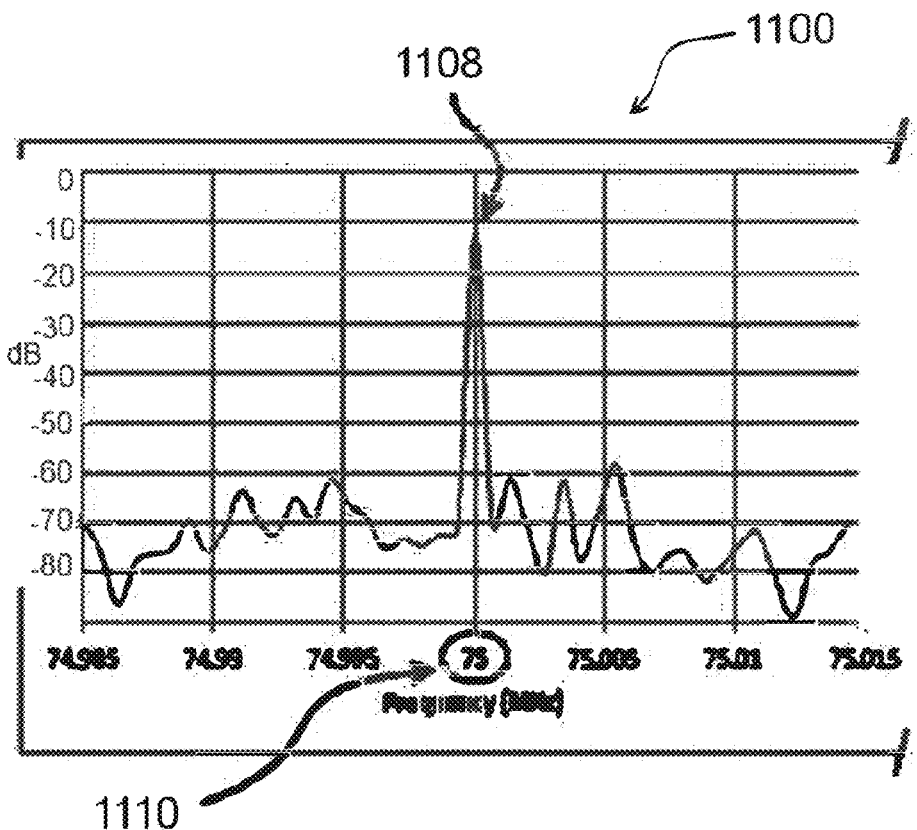
FIGS. 13A-13B illustrate an example electromagnetic spectrum showing the $15^{th}$ harmonic and $16^{th}$ harmonic of a 5 MHz harmonic series.
Figure 13B:
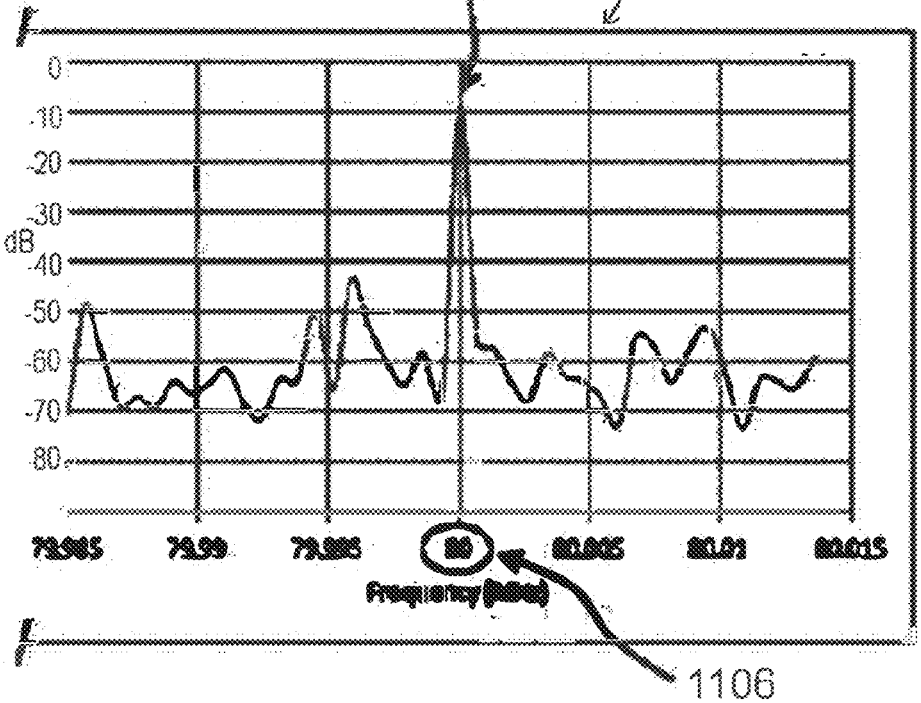

FIGS. 13A and 13B illustrate another exemplary embodiment contemplates utilizing characteristics of harmonically related peaks to perform device status prognostics. An exemplary medical device signature consisting of two peaks 1108 and 1104 that are part of a harmonic spectrum. These signals represent the $15^{th}$ and $16^{th}$ harmonics of a 5 MHz fundamental frequency, as these peaks are centered at the $15^{th}$ and $16^{th}$ multiples of 5 MHz, the fundamental frequency. The frequency positions of these peaks are illustrated by 1106 and 1110. Aging of the medical device can result in the oscillator responsible for producing the 5 MHz fundamental frequency to experience jitter, which is a deviation from true periodicity in a periodic signal. Typically, electronic oscillators will be specified to a certain fundamental frequency, with a tolerance that is a small percentage of the fundamental oscillator. Aging of the medical device can result in the fundamental frequency shifting outside of the specified tolerance bounds. For example, the shift of the fundamental frequency due to aging can be measured as $\Delta f$. This results in the frequency position of the higher order harmonics, 1110 and 1106 in FIGS. 13A-13B to deviate from its expected value by $15 \times \Delta f$ and $16 \times \Delta f$, respectively. The measure of deviation from the expected peak value of these peaks is therefore an indicator of device functionality status of the medical device, and can be used to predict the status via the software processes within the stationary device 100 or the hand-held device 200.

In an embodiment, a method is provided for detecting, in a real-time manner, a presence or an absence of a cyber attack onto a medical apparatus at least comprising one or more processing devices, a data transmission connection to a network, and non-linear attachments of the one or more processing devices to clock signals. The method comprises the steps of capturing, with an antenna, one or more emissions of electromagnetic energy from the processing devices. Then, converting, with a receiver coupled to the antenna, the one or more emissions captured by the antenna from an analog to a digital form. Next, generating, with a controller, a digital signal in a time domain. Converting, with the controller, the digital signal from the time domain to a frequency domain, the digital signal containing a signature of cross modulation products from the non-linear attachments. Then, processing, with the controller in the frequency domain, the signature of cross modulation products to determine mixing characteristics of the cross modulation products and/or harmonic features to determine mixing characteristics of the cross modulation products. Next, detecting, with the controller, based on the mixing characteristics, the absence or the presence of the cyber attack. And, triggering, with the controller, an event when detecting the presence or an absence of the cyber attack.

In an embodiment, a method is provided for detecting, in a real-time manner, a presence or an absence of an anomaly in a medical apparatus. The anomaly can comprise at least one of a cyber intrusion attempt, a cyber-attack, a cyber-physical attack, a malware, a physical malware, a tamper, a malicious software, an anomalous software, a modified software, a malicious firmware, an anomalous firmware, a modified firmware, a malicious circuitry, an anomalous circuitry, and a modified circuitry. Although it is contemplated herewithin that the method can be provided for detecting, in a real-time manner, a presence or an absence of an anomaly in any electronic device.

The medical apparatus can at least comprise one or more processing devices and a data transmission connection to a network. The method comprises the steps of capturing, with an antenna, an emission of electromagnetic energy, in a radio frequency (RF) range, from the processing devices. Then, converting, with a receiver coupled to the antenna, the emission captured by the antenna from an analog to a digital form. Next, generating, with a controller, a digital signal of the emission in a time domain. Converting, with the controller, the digital signal from a time domain into a frequency domain with the digital signal containing an emission signature at two or more frequencies. Next, measuring, with the controller in the time domain, an emission characteristic of the emission signature at the two or more frequencies. Measuring of the emission characteristic can comprise applying, with the controller, Bessel Functions of a first kind due to a frequency modulation. Then, comparing therebetween, with the controller, measurements of the emission characteristic in each of the two or more frequencies. Detecting, with the controller, based on a comparison of the emission characteristic in the each of the two or more frequencies, the absence or the presence of the anomaly. Finally, triggering, with the controller, an event when detecting the presence or an absence of the anomaly.

In an embodiment, therein is provided a method of detecting, in a real-time manner, a presence or an absence of an anomaly in a medical apparatus. The medical apparatus at least comprises one or more processing devices, a data transmission connection to a network. The method comprises the steps of capturing, with an antenna, an emission of electromagnetic energy, in a radio frequency (RF) range, from the processing devices. Then converting, with an analog to digital converter within a receiver coupled to the antenna, the emission captured by the antenna from an analog to a digital form. Next, generating, with a controller, a digital waveform in a time domain, where the digital waveform contains an emission signature. Converting, with the controller, the emission signature from a time domain into a frequency domain. Then, detecting, with the controller in the time domain, a time varying content, in which sideband frequencies arise and disappear due to cyclic function of the analog to digital converter, and/or frequency shifts occur. Detecting, with the controller, based on a detection of the time varying content, the absence or the presence of the anomaly. And, triggering, with the controller, an event when detecting the presence or an absence of the anomaly.

In either of the embodiments, the emission characteristic comprises one of a harmonic frequency shifting, a total emitted energy, an energy distribution, a peak height, and a peak shift.

In either of the embodiments, the data transmission comprises at least one of Ethernet, IEEE 802.11 standard WiFi, Bluetooth communication standard, a Worldwide Interoperability for Microwave Access (WiMax) standard, and a ZigBee communication standard.

In either of the embodiments, triggering, of the event can comprise activating an alarm when detecting the presence of the anomaly or the cyber attack. The alarm can be an audio annunciation, for example of a message, or a visual annunciation on medical apparatuses equipped with a light or a lighted button, where such light will operate differently from a selected or a normal operation. Triggering of an event can comprise displaying a message on a display of the medical apparatus equipped with such display. Triggering of an event can comprise providing disabling an operation of the medical apparatus by providing an input signal to the one or more processing devices therewithin. Triggering of an event can comprise disabling, with the controller, communication of the medical apparatus with the network by triggering an input signal to the one or more processing devices within the medical apparatus. Triggering of an event can comprise generating and transmitting a communication to a server on the network so that an operator of such network can decide on an action regarding the operation of the medical apparatus.

Unintended radiated and conducted electromagnetic emissions contain a wealth of cyber information that is causally dependent upon system status. Any change to system status, such as a hardware Trojan, or introduction of ransomware and other malicious software attack, necessarily alters the emitted waveform in some quantifiable way, and therefore can be automatically detected and analyzed by the highly sensitive Hiawatha sensor. Cyber information can be captured through emissions analysis, and used for active and real-time monitoring of the cyber-security status of the medical device under test.

In addition to providing substantial information regarding cyber information states, unintended emissions also enable reliable real-time detection of cyber-attacks. Examples of unintended RF emissions expected from detectable cyber-attacks include the following:

RowHammer Attack
Known/Unknown Firmware/Software in Single Loop Structure
Known/Unknown Hardware Accelerated Code
Single Instruction, Multiple Data Code
Control Flow Tracking of Single-threaded Program States
Control Flow Tracking of Multi-threaded Program States Each of these types of attacks is expected to have its own unique emissions signature characteristics, or will change the stable-state emissions characteristics of the device In either of the embodiments, the antenna, receiver and controller can be provided in various forms.

In one aspect, they can be integrated in a single device, for example such as a probe. The probe can be disposed within the medical apparatus, can be positioned remotely (at a distance) from it or attached to the exterior surface thereof. The controller within the probe can be directly coupled to the power supply within the medical apparatus or the power connection therewithin or can be provided with its own power supply or power connection thereto. I one aspect, the probe can be provided as a handheld device that would be either held by a user or positioned at adjacent to the medical apparatus during operation of the handheld device.

In one aspect, the antenna, receiver and controller can be integrated into an embedded electronic device that can comprise a chassis, one or more printed circuit board assemblies mounted on and/or in the chassis, a power supply, an input/output assembly, and/or a forced air conduction cooling fan, and a common mode probe. The device is embedded into a medical device such that the common mode probe has access to the communications bus of the medical device.

In one aspect, an enclosed chassis is mounted on and/or adjacent to a networked medical device or networked medical computer terminal such that the electromagnetic emissions are received by a conformal antenna connected to the apparatus.

In one aspect, an enclosed chassis is mounted on and/or in a network server cabinet connected to a common mode probe tied to the communications bus, which could be ethernet or a lan line. The common mode probe will measure emissions from the communication bus and identify anomalous communications traffic. If anomalous communications traffic is identified an event will be triggered notifying personnel of the presence of the anomaly.

In one aspect, the antenna, receiver and controller can be disposed or mounted independently within the medical apparatus and operatively coupled therebetween as well as being operatively coupled to the component(s) of the medical apparatus.

In either of the aspects, the antenna can be any one of a conformal antenna, a common mode probe, a differential mode probe, a semi-fractal antenna, a loop antenna, a dipole antenna and/or a monopole antenna.

In either of the aspects, the receiver can comprise a low noise amplifier, an RF signal splitter, one or more tuners, one or more Analog to Digital converters, and a controller. A reference clock supply is optional.

In either of the aspects, the controller comprises one or more one or more processors or logic devices, and a non-transitory (tangible) computational (computer readable recording) medium comprising executable instructions that, when executed by said one or more processors or logic devices, cause said one or more processors or logic devices to perform the above described method steps. The non-transitory (tangible) computational (computer readable recording) medium resides in a memory. In an embodiment, the more one or more processors and memory may be integrated on a single integrated circuit.

Tangible computer readable medium means any physical object or computer element that can store and/or execute computer instructions. Examples of tangible computer readable medium include, but not limited to, a compact disc (CD), digital versatile disc (DVD), blu-ray disc (BD), usb floppy drive, floppy disk, random access memory (RAM), read-only memory (ROM), erasable programmable read-only memory (EPROM), optical fiber, etc. It should be noted that the tangible computer readable medium may even be paper or other suitable medium in which the instructions can be electronically captured, such as optical scanning. Where optical scanning occurs, the instructions may be compiled, interpreted, or otherwise processed in a suitable manner, if necessary, and then stored in computer memory.

The non-transitory computer-readable recording medium may include program instructions, data files, and data structures, alone or in a combination thereof.

Alternatively, it may be a plugin or part of a software code that can be included in, or downloaded and installed into a computer application. As a plugin, it may be embeddable in any kind of computer document, such as a webpage, word document, pdf file, mp3 file, etc.

Thus, any of the above disclosed methods may be implemented in the form of software stored on a computer-readable non-transitory information storage medium such as an optical or magnetic disk, a non-volatile memory (e.g., Flash or ROM), RAM, and other forms of volatile memory. The information storage medium may be an internal part of the computer, for example such as a general use computer, a removable external element coupled to the computer, or unit that is remotely accessible via a wired or wireless network. The antenna and receiver can be then coupled to the computer. In one aspect, the computer may comprise a communication module comprising the receiving means. In one aspect, the controller can comprise an information storage medium that may be an internal part of the computer, a removable external element coupled to the computer, or unit that is remotely accessible via a wired or wireless network.

The disclosed subject matter can be implemented by single or multiple algorithms.

Persons of ordinary skill in the art may appreciate that, in combination with the examples described in the embodiments herein, units and algorithm steps can be implemented by electronic hardware, computer software, or a combination thereof. In order to clearly describe the interchangeability between the hardware and the software, compositions and steps of every embodiment have been generally described according to functions in the foregoing description. Whether these functions are performed using hardware or software depends on particular applications and design constraints of the technical solutions. A person skilled in the art may use different methods to implement the described functions for each specific application. However, such implementation should not be considered as beyond the scope of the present invention.

In one aspect, detection of intrusion, cyber-attacks, and cyber-physical attacks can be realized by using multiple modes of measuring the signatures in multiple domains and combining that data with fault monitoring and bitstream monitoring of intended signals.

It would be understood that the microprocessor based controller functions as a computing device.

As will be appreciated by those of ordinary skill in the art, aspects of the various embodiments may be embodied as a system, method or computer program product.

Therefore, the subject matter may take the form of a computer program product containing one or more sequences of machine-readable instructions describing a method as disclosed above, or a data storage medium (e.g., semiconductor memory, magnetic or optical disk) having such a computer program stored therein.

Obviously, those skilled in the art shall understand that the above-mentioned components and steps of the disclosure can be realized by using a general purpose computing device, can be integrated in one computing device or distributed on a network which consists of a plurality of computing devices. For example, conversion of the data from the time domain into frequency domain can be done remotely and by a separate computing device from measuring the emission characteristics (artifacts). Alternatively, the components and the steps of the disclosure can be realized by using the executable program code of the computing device. Consequently, they can be stored in the storing device and executed by the computing device, or they are made into integrated circuit component respectively, or a plurality of components or steps thereof are made into one integrated circuit component. Thus, the disclosure is not limited to any particular combination of hardware and software.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Smalltalk, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors can be programmed using languages such as assembly, C, C++ or the like. FPGAs, ASICs and CPLDs can be often programmed using hardware description languages (HDL) such as VHSIC hardware description language (VHDL) or Verilog that configure connections between internal hardware modules with lesser functionality on a programmable device. Finally, it needs to be emphasized that the above mentioned technologies can be often used in combination to achieve the result of a functional module.

In an embodiment, a method is provided to detect, in a real-time manner, a presence or an absence of a cyber attack onto a medical apparatus at least comprising one or more processing devices, a data transmission connection to a network, and non-linear attachments of the one or more processing devices to clock signals. The method comprises the steps of capturing, with an antenna, one or more emissions of electromagnetic energy from the processing devices; converting, with a receiver coupled to the antenna, the one or more emissions captured by the antenna from an analog to a digital form; generating, with a controller, a digital signal in a time domain; converting, with the controller, the digital signal from the time domain to a frequency domain, the digital signal containing a signature of cross modulation products from the non-linear attachments; processing, with the controller in the frequency domain, the signature of cross modulation products to determine mixing characteristics of the cross modulation products and/or harmonic features; detecting, with the controller, based on the mixing characteristics, the absence or the presence of the cyber attack; and triggering an event when detecting the presence of the cyber attack.

A feature of this embodiment, is that the step of processing the signature of cross modulation products comprises a step of generating, with the controller, harmonic sideband frequencies if the digital signal is a non-sinusoidal signal.

A feature of this embodiment, is that step analyzing harmonic side bands comprises a step of utilizing, with the controller, one of an amplitude modulation, a frequency modulation and a combination thereof.

A feature of this embodiment, is that step of processing the signature of cross modulation products comprises a step of analyzing, with the controller, a modulated frequency domain signal.

A feature of this embodiment, is that the step of analyzing a modulated frequency domain signal comprises a step of determining, with the controller, one or more values of the modulation index $\beta$.

A feature of this embodiment, is that the step of detecting the absence or the presence of the cyber attack comprises a step of scoring, with the controller, the one or more values of the modulation index $\beta$.

A feature of this embodiment, is that the step of processing the signature of cross modulation products comprises a step of determining, with the controller, a phase noise, where the phase noise is generated by small sinusoidal currents.

A feature of this embodiment, is that the step of triggering an event comprises a step of triggering an alarm.

A feature of this embodiment, is that step of triggering an event comprises a step of transmitting a communication to a remote device.

A feature of this embodiment, is that step of triggering an event comprises a step of generating, with the controller, a trigger signal and a step of disabling operation of the medical apparatus in a response to a receipt of the trigger signal.

A feature of this embodiment, is that the step of converting the one or more emissions, comprises a step of executing a Fast Fourier Transform on the digitized signal.

A feature of this embodiment, is that antenna, the receiver and controller are integrated into a single device.

A feature of this embodiment, is that the single device is positioned remotely from the medical apparatus.

A feature of this embodiment, is that the single device is integrated with the medical apparatus.

A feature of this embodiment, is that the antenna and sensor are integrated with the medical apparatus and the controller is disposed remotely therefrom.

A feature of this embodiment, is that the controller comprises a communication connection with a remote network computer or server.

A feature of this embodiment, is that the alarm can be received at a mobile communication device for alarming a medical professional tasked with monitoring health condition of a patient connected to the medical apparatus.

A feature of this embodiment, is that the method can be used to monitor also verify proper monitoring of a health condition in a patient by detecting any anomaly in operational status of the medical apparatus.

In an embodiment, a method is provided to detect, in a real-time manner, a presence or an absence of an anomaly in a medical apparatus at least comprising one or more processing devices, a data transmission connection to a network. The method comprises the steps of capturing, with an antenna, an emission of electromagnetic energy, in a radio frequency (RF) range, from the processing devices; converting, with a receiver coupled to the antenna, the emission captured by the antenna from an analog to a digital form; generating, with a controller, a digital signal in a time domain; converting, with the controller, the digital signal from the time domain into a frequency domain, the digital signal containing an emission signature at two or more frequencies; measuring, with the controller in the frequency domain, an emission characteristic of the emission signature at the two or more frequencies; comparing, with the controller, measurements of the emission characteristic in each of the two or more frequencies; detecting, with the controller, based on a comparison of the emission characteristic in the each of the two or more frequencies, the absence or the presence of the anomaly; and triggering, with the controller, an alarm when detecting the presence of the anomaly.

A feature of this embodiment, is that the step of measuring of the emission characteristic comprises a step of applying, with the controller, Bessel Functions of a first kind due to a frequency modulation.

A feature of this embodiment, is that the emission characteristic can comprise any one of a harmonic frequency shifting, a total emitted energy, an energy distribution, a peak height, and a peak shift.

A feature of this embodiment, is that the data transmission can comprise at least one of Ethernet, IEEE 802.11 standard WiFi, Bluetooth communication standard, a Worldwide Interoperability for Microwave Access (WiMax) standard, and a ZigBee communication standard.

A feature of this embodiment, is that the anomaly can comprise at least one of a cyber intrusion attempt, a cyber attack, a cyber-physical attack, a malware, a physical malware, a tamper, a malicious software, an anomalous software, a modified software, a malicious firmware, an anomalous firmware, a modified firmware, a malicious circuitry, an anomalous circuitry, and a modified circuitry.

In an embodiment, a method is provided to detect, in a real-time manner, a presence or an absence of an anomaly in a medical apparatus at least comprising one or more processing devices, a data transmission connection to a network. The method comprises the steps of capturing, with an antenna, an emission of electromagnetic energy, in a radio frequency (RF) range, from the processing devices; converting, with an analog to digital converter within a receiver coupled to the antenna, the emission captured by the antenna from an analog form to a digital form; generating, with a controller, a digital waveform in a time domain, the digital waveform containing an emission signature; converting, with the controller, the emission signature from a time domain to a frequency domain; detecting, with the controller in the time domain, a time varying content, in which sideband frequencies arise and disappear due to cyclic function of the analog to digital converter, and/or frequency shifts occur; detecting, with the controller, based on a detection of the time varying content, the absence or the presence of the anomaly; and triggering, with the controller, an alarm when detecting the presence of the anomaly.

In this method, the controller comprises one or more processors or logic devices, and a non-transitory computational medium comprising executable instructions that, when executed by the one or more processors or logic devices, cause the one or more processors or logic devices to perform the method steps.

In an embodiment, a device is configured to detect, in a real-time manner, a presence or an absence of an anomaly in an electronic apparatus at least comprising one or more processing devices, a data transmission connection to a network. The device comprises a sensor coupled to a data bus, the sensor configured to capture information content communicated through the data bus representing a form of electromagnetic emissions being at least one of differential mode electromagnetic emissions, common mode electromagnetic emissions, coupled radiated electromagnetic emissions, and data bit streams and convert information content from an analog signal to a digital signal form; one or more processors or logic devices; and a non-transitory computational medium comprising executable instructions that, when executed by the one or more processors or logic devices, cause the one or more processors or logic devices to perform the following steps on the captured information content: generate a digital signal in a time domain, convert the digital signal from the time domain to a frequency domain, the digital signal containing a signature of cross modulation products from the non-linear attachments, process, in the frequency domain, the signature of cross modulation products to determine mixing characteristics of the cross modulation products and/or harmonic features, detect, based on the mixing characteristics, the absence or the presence of the cyber attack, and trigger an event when detecting the presence of the cyber attack.

In an embodiment, a device is configured to detect, in a real-time manner, a presence or an absence of an anomaly in an electronic apparatus at least comprising one or more processing devices, a data transmission connection to a network. The device comprises a sensor coupled to a data bus, the sensor configured to capture information content communicated through the data bus representing a form of electromagnetic emissions being at least one of differential mode electromagnetic emissions, common mode electromagnetic emissions, coupled radiated electromagnetic emissions, and data bit streams and convert information content from an analog signal to a digital signal form; one or more processors or logic devices; and a non-transitory computational medium comprising executable instructions that, when executed by the one or more processors or logic devices, cause the one or more processors or logic devices to perform the following steps on the digital signal: generate a digital signal in a time domain, convert the digital signal from the time domain into a frequency domain, the digital signal containing an emission signature at two or more frequencies, measuring, in the frequency domain, an emission characteristic of the emission signature at the two or more frequencies, compare measurements of the emission characteristic in each of the two or more frequencies, detect based on a comparison of the emission characteristic in the each of the two or more frequencies, the absence or the presence of the anomaly, and trigger an event when detecting the presence of the anomaly.

In an embodiment, a coupling device is configured to detect, in a real-time manner, a presence or an absence of an anomaly in an electronic apparatus at least comprising one or more electronic components, one or more processing devices, and a data transmission connection to a network. The coupling device comprises a sensor; and a controller coupled to the sensor, the device being further configured to receive and process electromagnetic emissions conducted through the data bus, the conducted emissions being at least one of differential mode electromagnetic emissions, common mode electromagnetic emissions, coupled radiated electromagnetic emissions, free field electromagnetic emissions and data bit streams. The coupling device is coupled to a data bus within the apparatus and acquires conducted emissions and processes the emissions to determine a presence or an absence of a threat a presence or an absence of a threat to the electronic apparatus.

In an embodiment, therein is provided a non-transitory computer readable recording medium, having recorded thereon a program for executing the method of any of the above method embodiments.

In an embodiment, therein is provided a tangible computer system programmed to implement a method of detecting, in a real-time manner, a presence or an absence of a cyber attack onto a medical apparatus at least comprising one or more processing devices, a data transmission connection to a network, and non-linear attachments of the one or more processing devices to clock signals, the method comprising: steps of any of the above method embodiments.

In an embodiment, a computer system is configured to detect, in a real-time manner, a presence or an absence of a cyber attack onto a medical apparatus at least comprising one or more processing devices, a data transmission connection to a network, and non-linear attachments of the one or more processing devices to clock signals comprising (i) an electronic, computer-accessible storage device, and (ii) a computer processor structured and programmed to automatically capture, with an antenna, an emission of electromagnetic energy, in a radio frequency (RF) range, from the processing devices; convert, with a receiver coupled to the antenna, the emission captured by the antenna from an analog signal form to a digital signal form; generate, with a controller, a digital signal in a time domain; convert, with the controller, the digital signal from the time domain into a frequency domain, the digital signal containing an emission signature at two or more frequencies; measure, with the controller in the time domain, an emission characteristic of the emission signature at the two or more frequencies; compare, with the controller, measurements of the emission characteristic in each of the two or more frequencies; detect, with the controller, based on a comparison of the emission characteristic in the each of the two or more frequencies, the absence or the presence of the anomaly; and trigger, with the controller, an alarm when detecting the presence of the anomaly.

In an embodiment, an article comprising a non-transitory tangible medium encoding computer-readable instructions implementing a method of using a computer system to detect, in a real-time manner, a presence or an absence of a cyber attack onto a medical apparatus at least comprising one or more processing devices, a data transmission connection to a network, and non-linear attachments of the one or more processing devices to clock signals by automatically capture, with an antenna, an emission of electromagnetic energy, in a radio frequency (RF) range, from the processing devices; convert, with a receiver coupled to the antenna, the emission captured by the antenna from an analog signal form to a digital signal form; generate, with a controller, a digital signal in a time domain; convert, with the controller, the digital signal from the time domain into a frequency domain, the digital signal containing an emission signature at two or more frequencies; measure, with the controller in the time domain, an emission characteristic of the emission signature at the two or more frequencies; compare, with the controller, measurements of the emission characteristic in each of the two or more frequencies; detect, with the controller, based on a comparison of the emission characteristic in the each of the two or more frequencies, the absence or the presence of the anomaly; and trigger, with the controller, an alarm when detecting the presence of the anomaly.

In an embodiment, an article comprises a tangible medium that is not a transitory propagating signal encoding computer-readable instructions that, when applied to a computer system comprising one or more computers, instruct the computer system to perform a method for detecting, in a real-time manner, a presence or an absence of a cyber attack onto a medical apparatus at least comprising one or more processing devices, a data transmission connection to a network, and non-linear attachments of the one or more processing devices to clock signals, comprising capturing, with an antenna, one or more emissions of electromagnetic energy from the processing devices; converting, with a receiver coupled to the antenna, the one or more emissions captured by the antenna from an analog to a digital form; generating, with a controller, a digital signal in a time domain; converting, with the controller, the digital signal from the time domain to a frequency domain, the digital signal containing a signature of cross modulation products from the non-linear attachments; processing, with the controller in the frequency domain, the signature of cross modulation products to determine mixing characteristics of the cross modulation products and/or harmonic features to determine mixing characteristics of the cross modulation products; detecting, with the controller, based on the mixing characteristics, the absence or the presence of the cyber attack; and triggering an event when detecting the presence of the cyber attack.

In an embodiment, a medical apparatus comprises one or more electronic components and/or processing devices; one or more clocks; non-linear attachments of the one or more electronic components and/or processing devices and the one or more clocks; an antenna configured to capture emission of electromagnetic energy, in a radio frequency (RF) range, from the one or more electronic components and/or processing devices;

a receiver coupled to the antenna, the receiver being configured to convert the emission captured by the antenna from an analog signal form to a digital signal form; and a controller comprising one or more processors or logic devices; and a non-transitory computational medium comprising executable instructions that, when executed by the one or more processors or logic devices, cause the one or more processors or logic devices to perform the following steps on the digital signal generate a digital signal in a time domain, convert the digital signal from the time domain into a frequency domain, the digital signal containing an emission signature at two or more frequencies, measure, in the time domain, an emission characteristic of the emission signature at the two or more frequencies, compare measurements of the emission characteristic in each of the two or more frequencies, detect based on a comparison of the emission characteristic in the each of the two or more frequencies, the absence or the presence of the anomaly, and trigger an event when detecting the presence of the anomaly.

In some embodiments, the device is configured to scan operation of the electronic apparatus either continuously, at pre-selected intervals, or as determined by the user or a monitoring professional.

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. It will be understood that variations, modifications, equivalents and substitutions for components of the specifically described exemplary embodiments of the invention may be made by those skilled in the art without departing from the spirit and scope of the invention as set forth in the appended claims.

It should be appreciated that reference throughout this specification to "one embodiment" or "an embodiment" means that a particular feature, structure or characteristic described in connection with the embodiment is included in at least one embodiment of the disclosed subject matter. Therefore, it is emphasized and should be appreciated that two or more references to "an embodiment" or "one embodiment" or "in an example" or "in one example" in various portions of this specification are not necessarily all referring to the same embodiment or the same variation. Furthermore, the particular features, structures or characteristics may be combined as suitable in one or more embodiments of the disclosed subject matter.

Similarly, it should be appreciated that in the description of embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

It should be noted that all possible combinations of features which would be implied by rendering the claims multiply dependent are explicitly envisaged and should be considered part of the invention.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Anywhere the term "comprising" is used, embodiments and components "consisting essentially of" and "consisting of" are expressly disclosed and described herein."

Furthermore, the Abstract is not intended to be limiting as to the scope of the claimed subject matter and is for the purpose of quickly determining the nature of the claimed subject matter.

What is claimed is:

1. A method of detecting, in a real-time manner, a presence or an absence of a cyber attack onto a medical apparatus, said method comprising:
   capturing, with an antenna, one or more emissions of electromagnetic energy radiated from a data bus;
   converting, with a receiver coupled to said antenna, said one or more emissions captured by said antenna from an analog form to a digital form;
   generating, with a controller, a digital signal in a time domain;
   converting, with said controller, said digital signal from said time domain to a frequency domain, said digital signal containing a signature of cross modulation products from non-linear attachments of one or more processing devices to clock signals;
   processing, with said controller in said frequency domain, said signature of cross modulation products to determine mixing characteristics of said cross modulation products and/or harmonic features;
   detecting, with said controller, based on said mixing characteristics, said absence or said presence of the cyber attack; and
   triggering an event when detecting said presence of the cyber attack.

2. The method of claim 1, wherein the step of processing said signature of cross modulation products comprises a step of generating, with said controller, harmonic sideband frequencies if said digital signal is a non-sinusoidal signal.

3. The method of claim 2, wherein the step of processing said signature of cross modulation products comprises a step of utilizing, with said controller, one of an amplitude modulation, a frequency modulation and a combination thereof.

4. The method of claim 1, wherein the step of processing said signature of cross modulation products comprises a step of analyzing, with said controller, a modulated frequency domain signal.

5. The method of claim 4, wherein the step of analyzing a modulated frequency domain signal comprises a step of determining, with said controller, one or more values of a modulation index $\beta$.

6. The method of claim 5, wherein said step of detecting said absence or said presence of the cyber attack comprises a step of scoring, with said controller, said one or more values of the modulation index $\beta$.

7. The method of claim 1, wherein the step of processing said signature of cross modulation products comprises a step of determining, with said controller, a phase noise, where said phase noise is generated by small sinusoidal currents.

8. The method of claim 1, wherein the step of triggering an event comprises a step of triggering an alarm.

9. The method of claim 1, wherein the step of triggering an event comprises a step of transmitting a communication to a remote device.

10. The method of claim 1, wherein the step of triggering an event comprises a step of generating, with said controller, a trigger signal and a step of disabling operation of said medical apparatus in a response to a receipt of said trigger signal.

11. The method of claim 1, wherein the step of converting said one or more emissions, comprises a step of executing a Fast Fourier Transform on said digital signal.

12. A method of detecting, a presence or an absence of an anomaly in a medical apparatus, said method comprising:
   capturing, with an antenna, an emission of electromagnetic energy radiated from components of said medical apparatus or connections to said medical apparatus through a data bus;
   converting, with a receiver coupled to said antenna, said emission captured by said antenna from an analog to a digital form;
   generating, with a controller, a digital signal in a time domain;

converting, with said controller, said digital signal from said time domain into a frequency domain, said digital signal containing an emission signature of cross modulation products from non-linear attachments of one or more processing devices to clock signals at two or more frequencies;

measuring, with said controller in said frequency domain, an emission characteristic of said emission signature at said two or more frequencies;

comparing, with said controller, measurements of said emission characteristic in each of said two or more frequencies; and detecting, with said controller, based on said comparing of said emission characteristic in said each of said two or more frequencies, said absence or said presence of the anomaly.

13. The method of claim 12, wherein measuring of said emission characteristic comprises applying, with said controller, Bessel Functions of a first kind due to a frequency modulation.

14. The method of claim 12, wherein said emission characteristic comprises one of a harmonic frequency shifting, a total emitted energy, an energy distribution, a peak height, and a peak shift.

15. The method of claim 12, wherein a data transmission comprises at least one of Ethernet, IEEE 802.11 standard WiFi, Bluetooth communication standard, a Worldwide Interoperability for Microwave Access (WiMax) standard, and a ZigBee communication standard.

16. The method of claim 12, wherein said anomaly comprises at least one of a cyber intrusion attempt, a cyber attack, a cyber-physical attack, a malware, a physical malware, a tamper, a malicious software, an anomalous software, a modified software, a malicious firmware, an anomalous firmware, a modified firmware, a malicious circuitry, an anomalous circuitry, and a modified circuitry.

17. The method of claim 12, wherein said controller comprises one or more processors or logic devices, and a non-transitory computational medium comprising executable instructions that, when executed by said one or more processors or logic devices, cause said one or more processors or logic devices to perform the method steps.

18. A computer-implemented method of detecting a presence or an absence of an anomaly in a medical apparatus, said computer-implemented method comprising:

converting an analog emission signal from a time domain into a frequency domain, said analog emission signal being carried through a data bus from components of said medical apparatus or connections to said medical apparatus, said analog emission signal containing emission characteristic of cross modulation products from non-linear attachments of one or more processing devices to clock signals at two or more frequencies;

measuring, in said frequency domain, said emission characteristic of cross modulation products from non-linear attachments of one or more processing devices to clock signals at each frequency from said two or more frequencies;

comparing measurements of said emission characteristic in said each frequency therebetween; and detecting based on said comparing of said measurements, the presence or the absence of the anomaly.

19. The computer-implemented method of claim 18, further comprising inductively coupling an analog data bus coupler to said data bus and acquiring said analog emission signal from said analog data bus coupler.

20. The computer-implemented method of claim 18, further comprising triggering, with a controller, an alarm when detecting said presence of the anomaly.

21. The computer-implemented method of claim 18, comprising coupling a capacitor and a resistor to data lines within said data bus and acquiring said analog emission signal as a capacitive signal.

22. The computer-implemented method of claim 18, comprising coupling a resistor and a transformer to two data lines within said data bus and acquiring said analog emission signal as a voltage differential between said two data lines.

23. The computer-implemented method of claim 18, comprising acquiring said analog emission signal as a common mode difference in voltage or a difference in common mode current flow between a shield and a data line of said data bus.

24. The computer-implemented method of claim 18, further comprising acquiring said analog emission signal through isolated resistors and an isolating transformer that are inductively coupled to said data bus.

* * * * *